United States Patent
Chen et al.

(10) Patent No.: US 7,639,484 B2
(45) Date of Patent: Dec. 29, 2009

(54) PORTABLE COMPUTER WITH MULTI-SECTIONED ARMS TO SUPPORT DISPLAY POSITION ADJUSTMENT AND MULTIPLE CONFIGURATIONS

(75) Inventors: Shaofen Chen, Plano, TX (US); Zhaofang Wen, Plano, TX (US)

(73) Assignee: Computer Ergo Tech, LLC, Plano, TX (US)

(*) Notice: Subject to any disclaimer, the term of this patent is extended or adjusted under 35 U.S.C. 154(b) by 232 days.

(21) Appl. No.: 11/713,269

(22) Filed: Mar. 2, 2007

(65) Prior Publication Data

US 2007/0159783 A1    Jul. 12, 2007

Related U.S. Application Data

(63) Continuation of application No. 11/252,671, filed on Oct. 18, 2005, now Pat. No. 7,215,538.

(51) Int. Cl.
G06F 1/16 (2006.01)
H05K 5/00 (2006.01)
H05K 7/00 (2006.01)

(52) U.S. Cl. .............................. 361/679.26; 361/679.21
(58) Field of Classification Search ................ 361/681, 361/683, 679.21, 679.26
See application file for complete search history.

(56) References Cited

U.S. PATENT DOCUMENTS

| | | | | |
|---|---|---|---|---|
| 5,206,790 A | * | 4/1993 | Thomas et al. | 361/681 |
| 5,255,214 A | | 10/1993 | Ma | |
| 5,383,138 A | * | 1/1995 | Motoyama et al. | 361/683 |
| 5,494,447 A | * | 2/1996 | Zaidan | 361/681 |
| 5,548,478 A | | 8/1996 | Kumar et al. | |
| 5,668,570 A | | 9/1997 | Ditzik | |
| 5,673,170 A | * | 9/1997 | Register | 361/681 |
| 5,805,415 A | | 9/1998 | Tran et al. | |
| 6,005,767 A | | 12/1999 | Ku et al. | |
| 6,016,171 A | | 1/2000 | Tsao | |
| 6,134,103 A | | 10/2000 | Ghanma | |
| 6,198,624 B1 | * | 3/2001 | Margaritis | 361/681 |
| 6,233,138 B1 | | 5/2001 | Osgood | |
| 6,262,885 B1 | | 7/2001 | Emma et al. | |
| 6,353,529 B1 | | 3/2002 | Cies | |
| 6,381,128 B1 | | 4/2002 | Kramer | |
| 6,392,877 B1 | | 5/2002 | Iredale | |

(Continued)

FOREIGN PATENT DOCUMENTS

JP   07325644 A  * 12/1995

*Primary Examiner*—Jayprakash N Gandhi
*Assistant Examiner*—Adrian S Wilson

(57) ABSTRACT

A portable computer is comprised of a base, a display, and one or more multi-sectioned arms connecting the base and the display. The arms can be folded and parked alongside the computer in a closed position. The arms can also be detached from both the base and the display. The display's viewing position can be continuously adjusted up, down, forward, backward, left, or right relative to the base, in a 3-dimensional range of movement with a semi-diameter of the height of the fully stretched arm. The base and the display are rotatably connected to the arms, so that the base and the display can rotate independently around the connections to control how they face each other, enabling multiple configurations in one computer. Five embodiments of the present invention are presented for illustration, based on arm designs and how they are connected to the base and the display.

21 Claims, 39 Drawing Sheets

U.S. PATENT DOCUMENTS

| | | |
|---|---|---|
| 6,430,038 B1 | 8/2002 | Helot et al. |
| 6,437,973 B1 | 8/2002 | Helot et al. |
| 6,464,195 B1 | 10/2002 | Hildebrandt |
| 6,480,373 B1 | 11/2002 | Landry et al. |
| 6,504,707 B2 | 1/2003 | Agata et al. |
| 6,532,147 B1 | 3/2003 | Christ, Jr. |
| 6,665,175 B1 | 12/2003 | deBoer et al. |
| 6,700,773 B1 | 3/2004 | Adriaansen et al. |
| 6,816,365 B2 | 11/2004 | Hill et al. |
| 6,826,043 B2 | 11/2004 | Chang |
| 6,912,121 B2 | 6/2005 | Karidis et al. |
| 6,920,039 B2 * | 7/2005 | Mochizuki et al. .......... 361/680 |
| 6,947,279 B2 | 9/2005 | Cheng et al. |
| 6,963,485 B2 * | 11/2005 | Hong .......................... 361/683 |
| 6,972,947 B2 * | 12/2005 | Duncan ....................... 361/683 |
| 7,065,835 B2 * | 6/2006 | Kuramochi ................. 361/803 |
| 7,094,059 B2 * | 8/2006 | Obermeyer .................... 439/6 |
| 7,215,538 B1 * | 5/2007 | Chen et al. .................. 361/683 |
| 2004/0057197 A1 | 3/2004 | Hill et al. |
| 2004/0066614 A1 * | 4/2004 | Hong .......................... 361/683 |
| 2004/0114319 A1 | 6/2004 | Hill et al. |
| 2004/0165342 A1 * | 8/2004 | Chang ......................... 361/681 |
| 2006/0185563 A1 | 8/2006 | Sweere et al. |

* cited by examiner

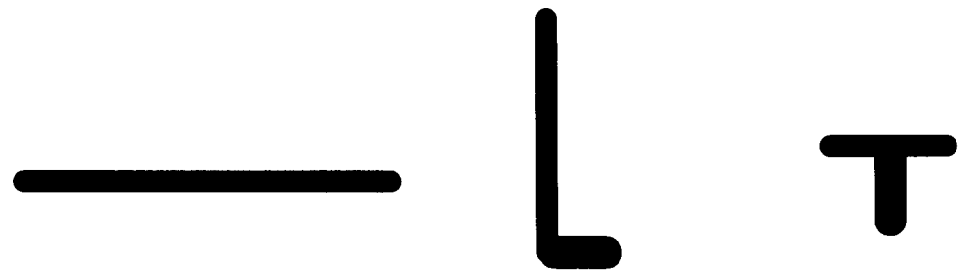
FIG.1
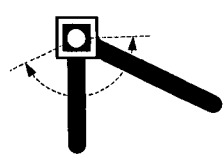
FIG.2A
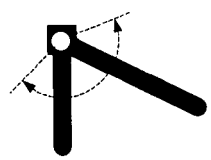
FIG.2B
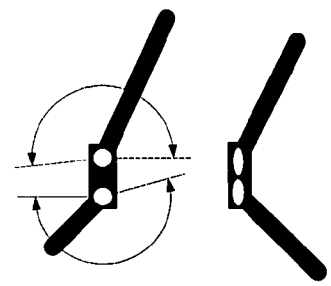
FIG.2C
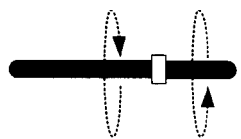
FIG.2D
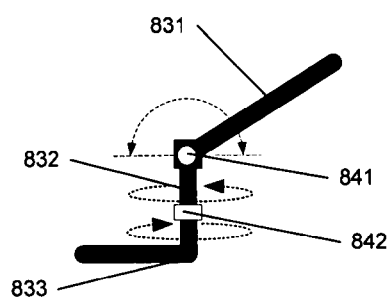
FIG.2E
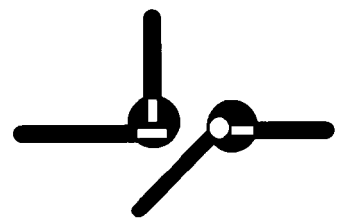
FIG.2F
FIG.2

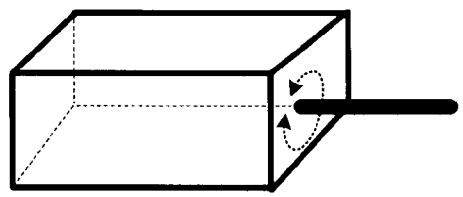
FIG.3A
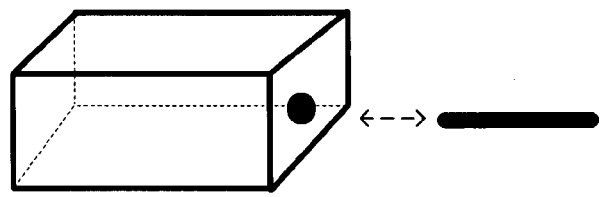
FIG.3B
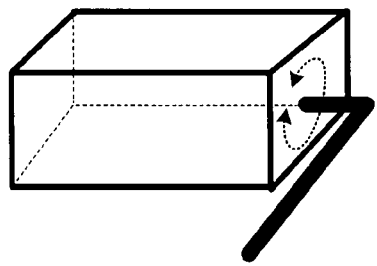
FIG.3C
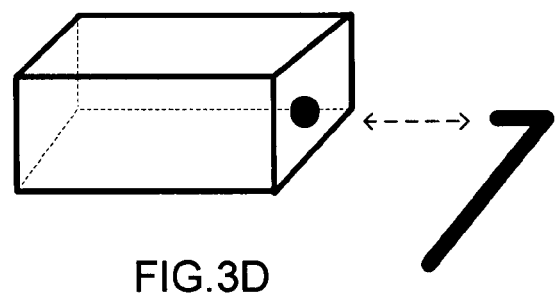
FIG.3D
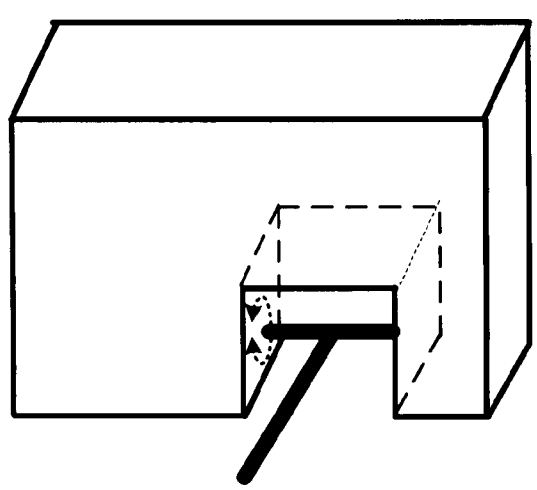
FIG.3E
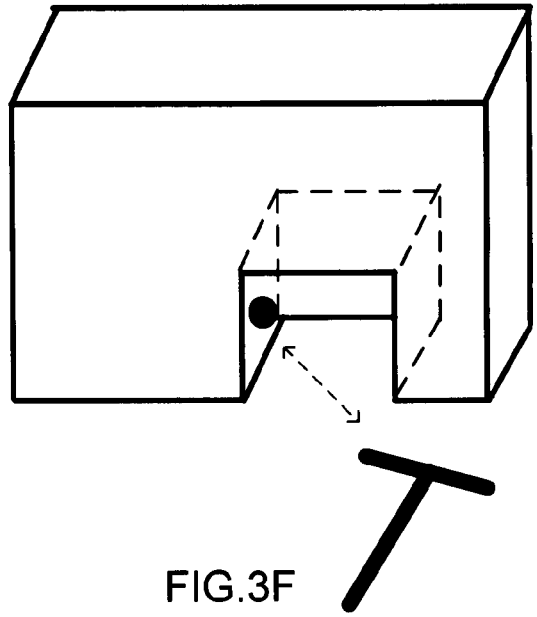
FIG.3F
FIG.3

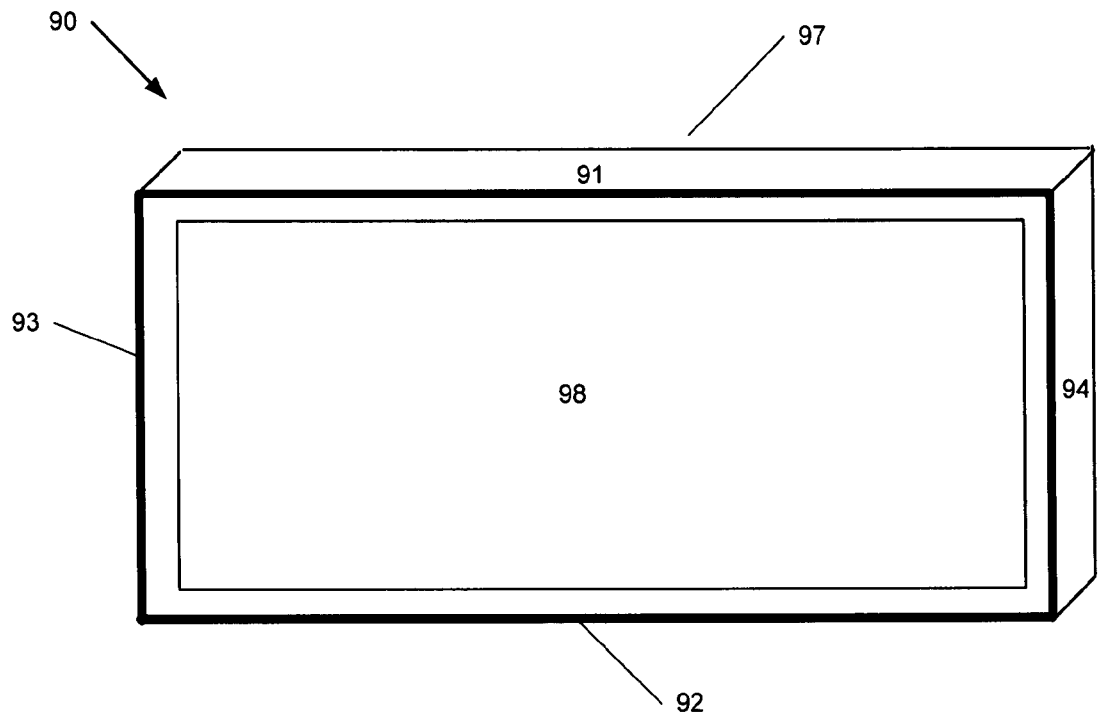
FIG.4A (Display)
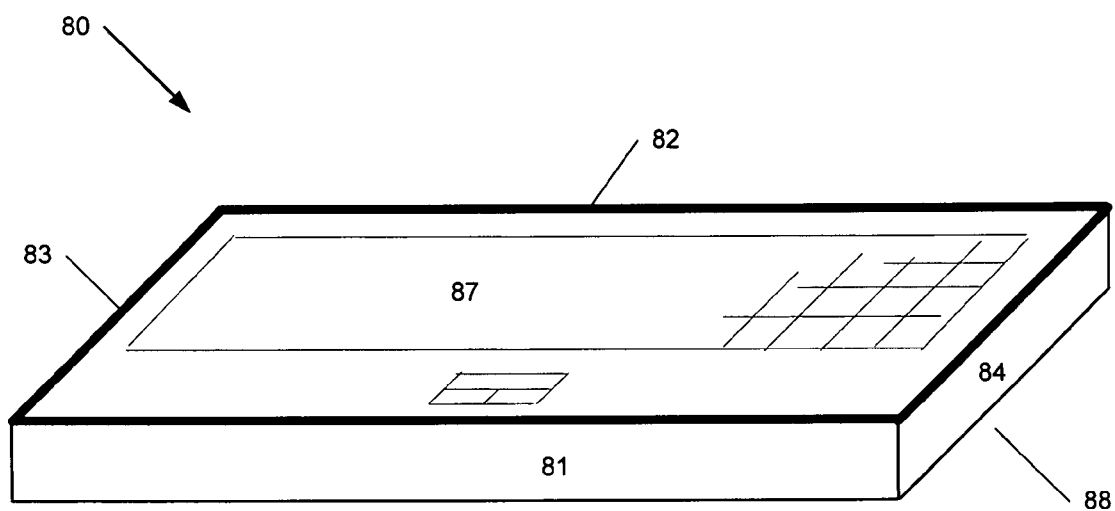
FIG.4B (Base)

PORTABLE COMPUTER WITH MULTI-SECTIONED ARMS TO SUPPORT DISPLAY POSITION ADJUSTMENT AND MULTIPLE CONFIGURATIONS

CROSS-REFERENCE TO RELATED APPLICATIONS

This application is a continuation application of U.S. patent application Ser. No. 11/252,671, filed Oct. 18, 2005, now U.S. Pat. No. 7,215,538.

STATEMENT REGARDING FEDERALLY SPONSORED RESEARCH OR DEVELOPMENT

Not applicable

REFERENCE TO SEQUENCE LISTING, A TABLE OR A COMPUTER PROGRAM LISTING COMPACT DISC APPENDIX

Not applicable

FIELD OF THE INVENTION

The present invention generally relates to a computer and other electronic devices. More specifically, the invention relates to portable computers having an adjustable display, multiple input devices, and multiple configurations.

BACKGROUND

Technological advancements have enabled portable computers to be built in various forms such as notebook, tablet PC, and personal digital assistants (PDA). Some of these forms can be unified into one single portable computer with multiple configurations.

Portable computers or notebooks typically comprise of a computer base and a display screen. The computer base generally holds the central processing unit, memory, electronic circuitry and other components, such as a keyboard, a disk drive. Typically, the base is hinged to the display in a manner in which the display folds down on the base, as shown by the computer (900) in FIG. 5. This design is referred to as the clam shell type enclosure. The display screen is typically connected to the base in such a way that the screen is hidden when the clam shell is closed. That is, the screen faces the upper side (typically, the keyboard) of the base.

There are several disadvantages of the clam shell design. One disadvantage is that the screen and the keyboard are next to each other. If the screen is placed at a comfortable viewing position, it will make the arms and shoulders uncomfortable for typing. On the other hand, if the computer is placed at a comfortable typing position, it would make the neck uncomfortable when looking at the screen. This problem can cause serious computer-related work injuries. Another disadvantage is that it needs to sufficient room to fully open the clam shell computer and position the display screen at an angle of about ninety (90°) or more with respect to the base for normal viewing; and this can be very difficult when operating in tight space, such as on the pull-out tray on the back of a declined airplane seat. Therefore, the clam shell design is insufficient for comfortable use.

In general, it is useful to be able to arrange a single portable computer into various configurations as follows:
(1) Improved Notebook configuration: The display screen can be adjusted to a desirable viewing angle, and to a position by height (up or down relative to the base) and by depth (forward or backward relative to the base's user edge).
(2) Shared viewing configuration: This is configuration (1) plus display adjustment by width (left or right of the space above the keyboard). (This can be useful when more than one people are looking at the screen at the same time.)
(3) Tablet PC configuration: The portable computer is closed with the base stacked underneath the upward-facing screen to be used as input pad. (The keyboard in this configuration can either be facing down or up. But it does not matter.)
(4) Stylus input configuration: The portable computer is open with screen up in normal viewing position; but the bottom side (opposite to the keyboard) of the base is up and used as input pad.
(5) Space saving configuration: The portable computer is closed with the display stacked underneath the base, so that the base can be used as a desktop machine together with a desktop display unit, typically with a bigger and better screen.
(6) Desk note configuration: The display is completely detached from the base so that the base can be used as a desktop machine together with a desktop display unit. (Both this configuration and the Space saving configuration can get the built-in display out of the way of the desktop monitor screen.)

There have been numerous attempts to address various subsets these six configurations. Many of them are focused on the screen viewing position adjustment using various approaches, which are all different from the multi-sectioned arm approach in the present invention. Some others are focused on mode transitioning between conventional notebook and tablet PC. There has been no single invention until now that can solve all six configurations in a single computer.

The purpose of the present invention is to support all or a subset of configurations (1)-(6) in one single portable computer. The invention also has some additional features.

SUMMARY

The present invention supports, in one single portable computer, all or a subset of configurations (1)-(6) as specified in the Background Section.

A portable computer according to the present invention generally includes a computer base and a display, which are connected by one or more multi-sectioned arms. Electronic and electrical wiring runs inside the arms. There are pivots on both the computer base and the display for connections with the arms. The arm sections are linked together by flexible joints, which allow the attached sections to rotate or turn around them.

The arms can be folded and positioned alongside the portable computer in closed positions. At the conventional screen viewing position, the arms can be turned away so that they do not block the computer base's edges for other uses, such as DVD and other outlets.

The arms can also be flexibly stretched to allow continuous adjustment of the screen's spatial position by height (up or down relative to the base), depth (forward or backward relative to the base's user edge), and width (left or right away from space above the base). (See configurations (1) and (2) in the Background section.)

To see the range of screen position adjustment, consider the middle point at the lower edge of the display. In the conventional clam shell enclosure design (as shown in FIG. 5), this mid-point travels along a pre-determined curve with a semi-diameter about the height of the hinge connection between the base and the display. In contrast, a portable computer of the present invention allows such a mid-point to be position at any location in a 3-dimensional range with a diameter about the height of the fully stretched multi-sectioned arm.

The arms are rotatably connected to the connection pivots on the base and the display, so that the base and display can rotate about the connection pivots. This way, the screen's viewing angle can be adjusted; furthermore, the portable computer can be set to various configurations (1)-(5) by arranging how the display and the base face each other. The arms can be detached completely from both the computer base and the display. This not only allows for the computer to be set for the desk note configuration (6), but also makes the arms replaceable (in case of damage, for example). Alternatively, all the configurations can be obtained by detaching the arms, rearranging the display and the base, and then re-attaching the arms (if necessary).

Friction at the joints and the connection pivots keeps the arm sections, the base, and the display in their selected relative positions. There are (optional) locks at the joints and connection pivots to keep arm sections, the base, and the display from leaving their chosen relative positions. There are mechanisms at the joints and the connection pivots to limit how much the attached arm sections can rotate or turn. (This can prevent potential wiring and other damages from unlimited rotating and turning.) There are also locks to prevent the connecting arms from unintentional detachment from the connection pivots.

Five different embodiments of the invention are presented, based on the number of arms and sections in each arm in the designs as well as how the arms are connected to the computer base and the display.

The computer base has two sides and four edges: the keyboard side, the bottom side (opposite to the keyboard), the left edge, right edge, the front edge (user edge), and the back edge. The display also has two sides and four edges: the screen side, the back side (opposite to the screen), the left and right edges, and the upper and lower edges (from the user's point of view).

In the first embodiment, one single multi-sectioned arm is connected to the back edges of the base and the display. In the second embodiment, two double-sectioned arms connect the base and the display by their side edges, with one on the left and the other on the right. The third embodiment is an extension of the second embodiment by replacing the two-sectioned side arms with side arms using combo-joints, thus enabling the display to move sideway. In the fourth embodiment, a bridge arm anchors on the left and right edges of the computer base, and in the middle of the bridge connects to the lower edge of the display. The fifth embodiment is an extension of the second embodiment by using triple-sections arms (just to show that it is possible to use side arms of more than two sections).

In summary, a portable computer according to the present invention can switch to all configurations (1)-(6) just by relative rotation and turning of arm sections, the display, and the base. Alternatively, the portable computer can switch among some of the configurations by arm detachment and re-attachment.

BRIEF DESCRIPTION OF THE DRAWINGS

Drawing Notations: Basic Building Blocks

FIG. 1 is a list of notations used in the drawings to represent one of the sections in a multi-sectioned arm in various scenarios.

FIG. 2 is a list of notations used in the drawings to represent a joint connecting two arm sections. They show how the attached arm sections can rotate relatively to the joint. (By relative, we mean that it can also been seen as the joint rotating while the arm section remain still.)

FIG. 3 is a list of notations in various scenarios an arm can be attached to and detached from the base and the display.

FIG. 4 lists the base and the display of a portable computer. In the drawings of all the embodiments, the base and the display will always use the same labels. (FIG. 4A denotes the display of a portable computer. FIG. 4B denotes the base of a portable computer.)

First Embodiment

Figure 5:
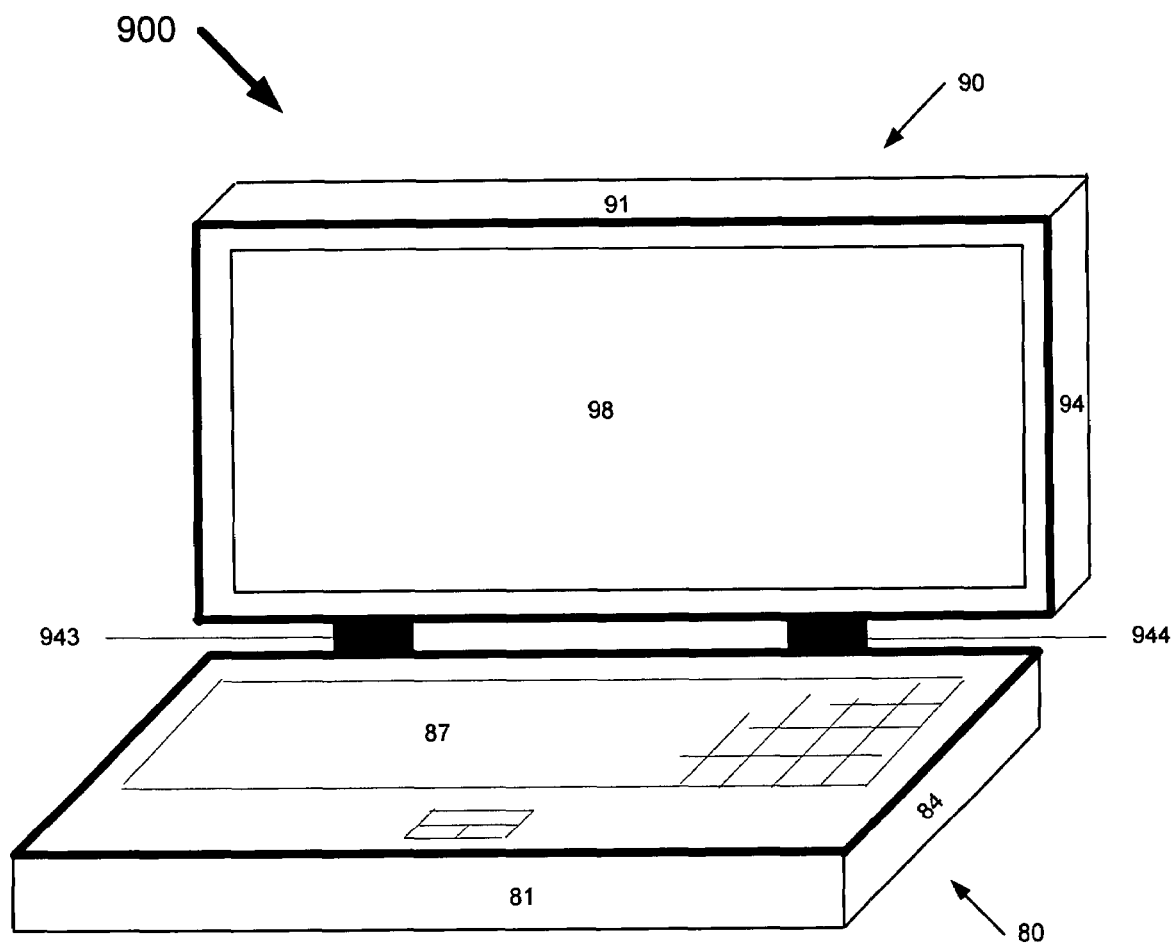
FIG. 5 is a perspective view of a conventional clam shell enclosure design of a portable computer, in an open position.
Figure 6A:
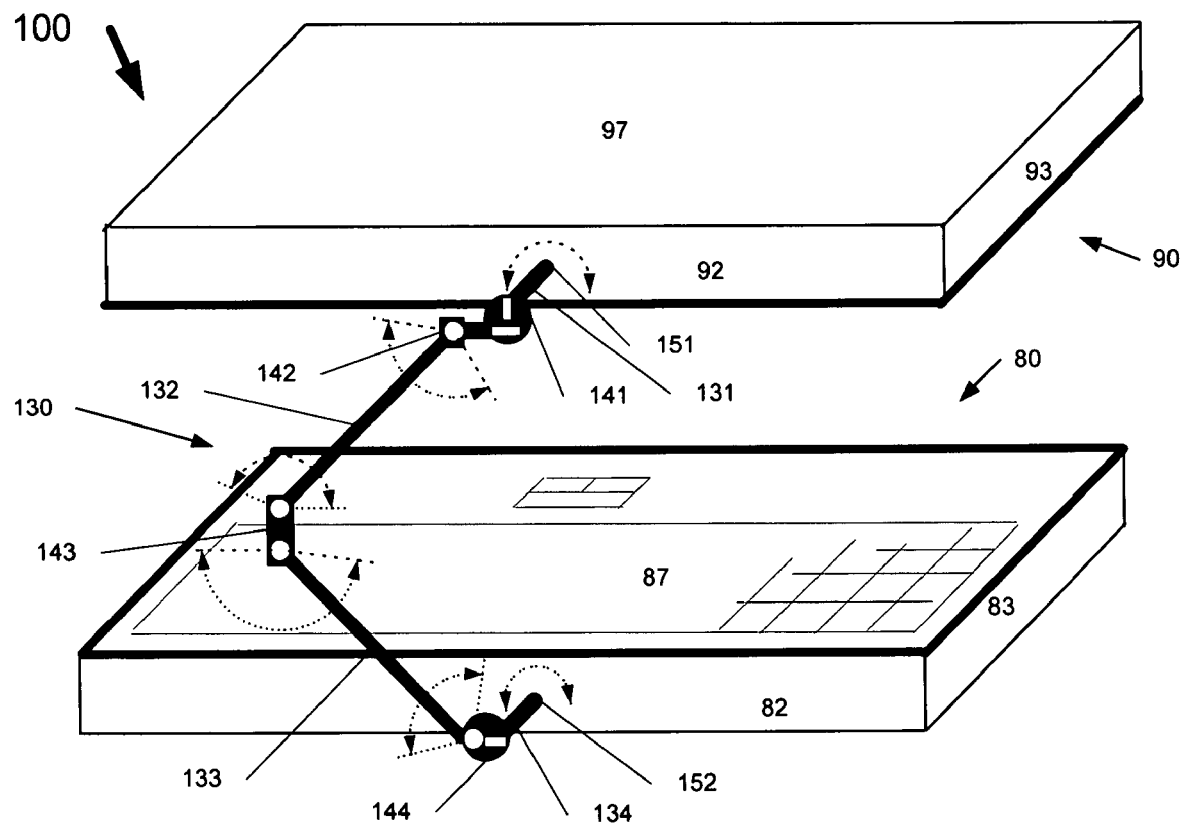

FIG. 6A is a perspective view of the first embodiment of the computer (100) of the present invention with a single back multi-sectioned arm, in a partially open position.

Figure 6B:
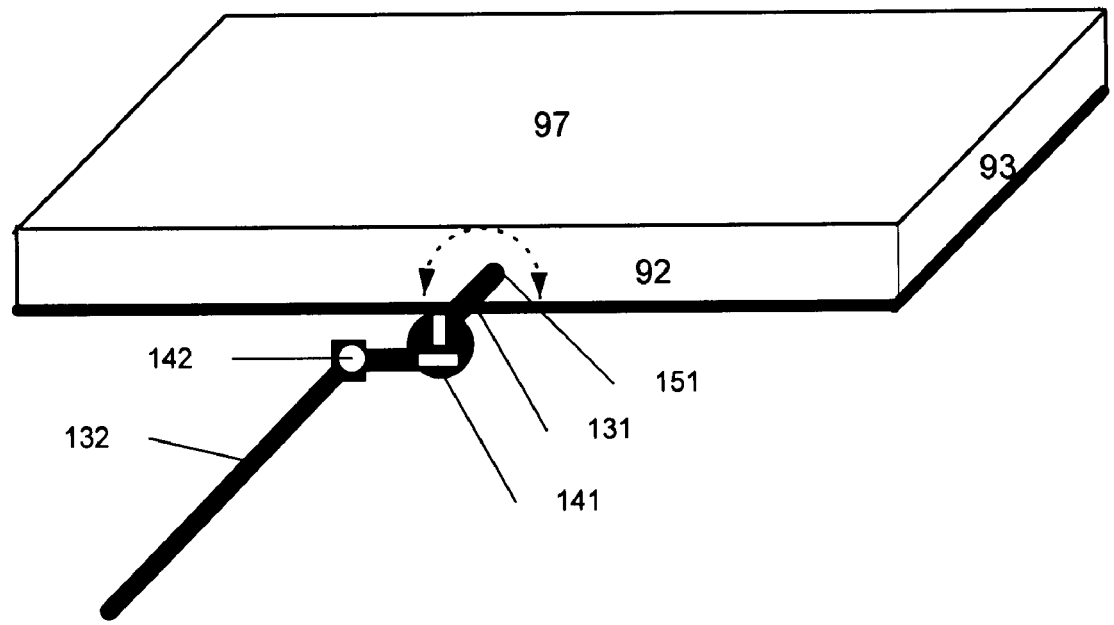

FIG. 6B is a split view of the top portion of the arm connected to the display of computer 100.

Figure 6C:
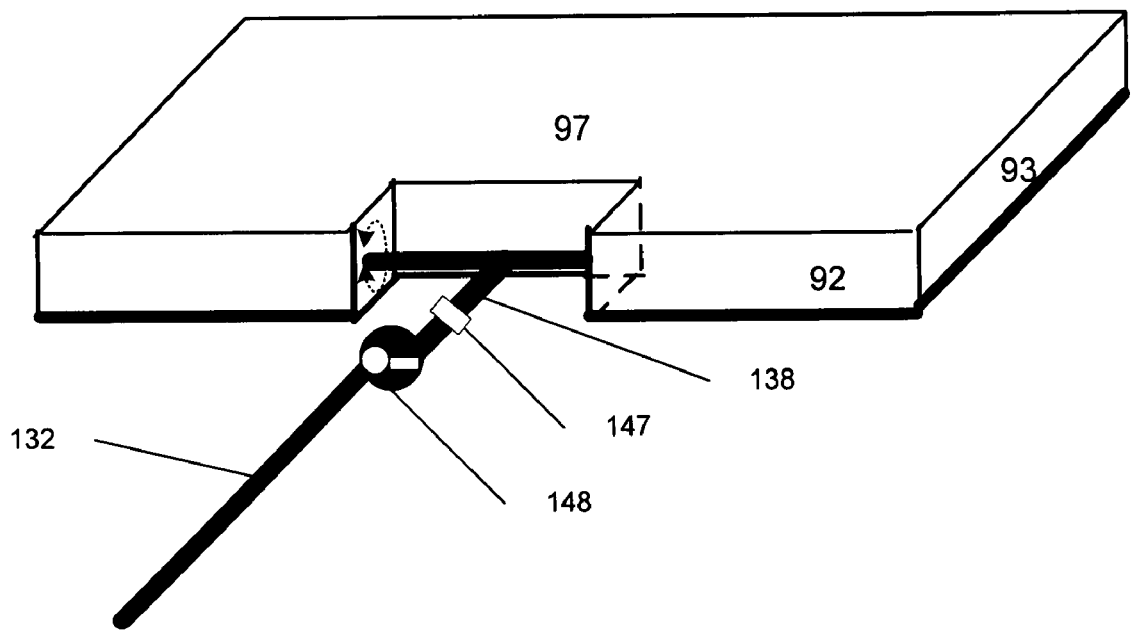

FIG. 6C is a possible substitute for the top portion of computer 100 as shown in FIG. 6B.

Figure 7:
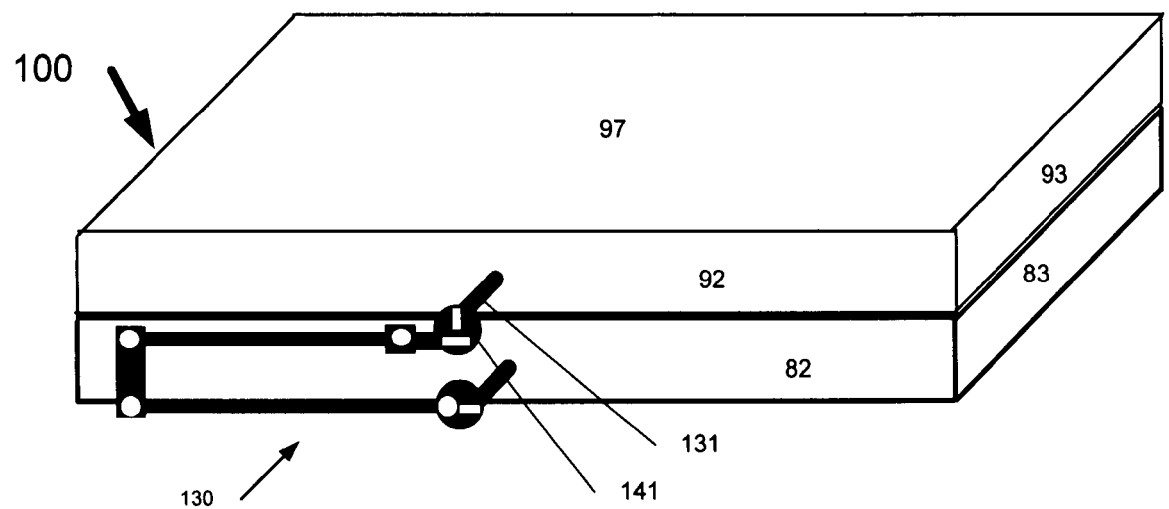

FIG. 7 is a perspective view of computer 100 in a closed position.

Figure 8:
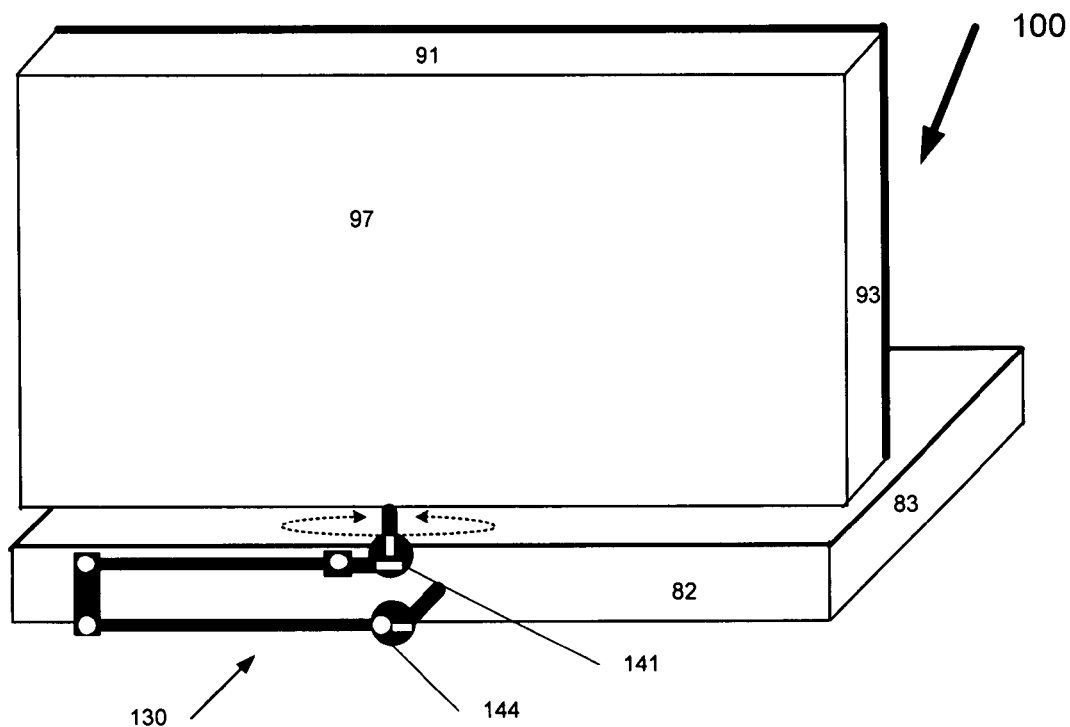

FIG. 8 is a perspective view of computer 100 in a conventionally opened screen-up position, with the folded arm placed next to the base's right back edge 82 (from the user's point of view).

Figure 9:
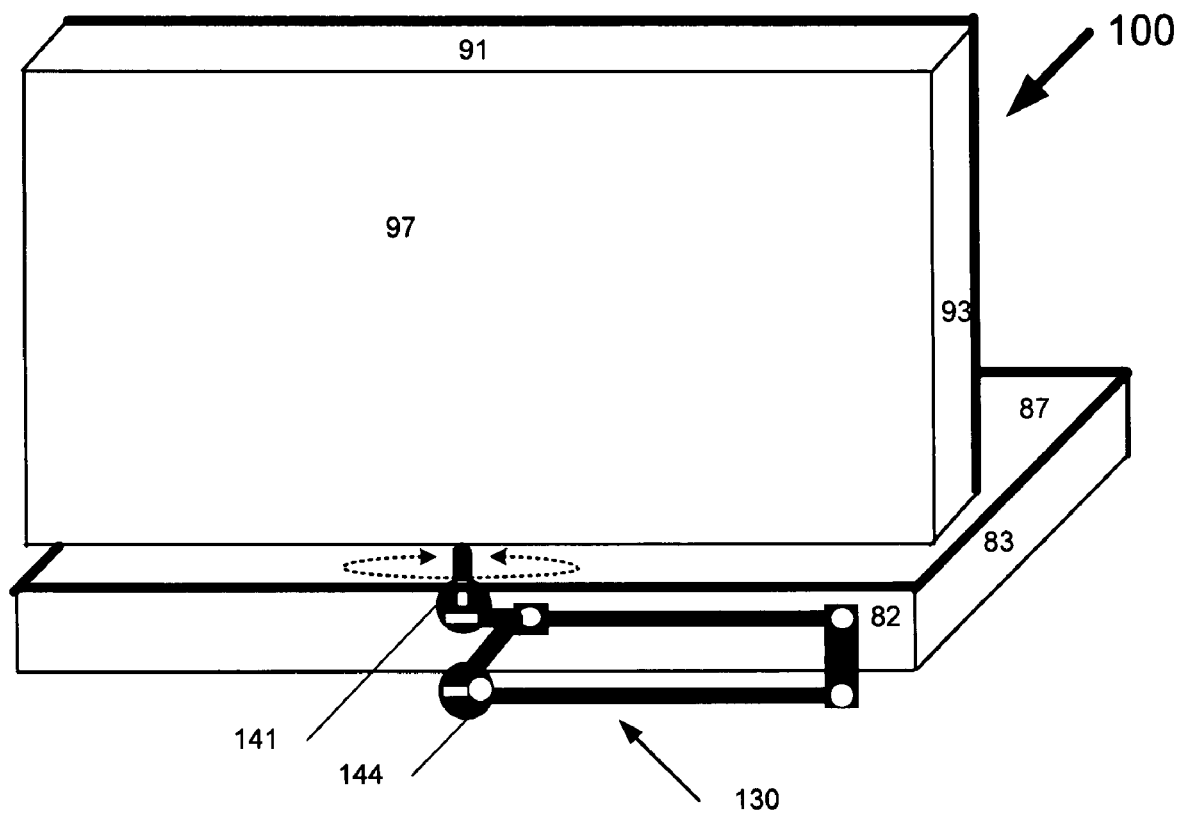

FIG. 9 is a perspective view of computer 100 in a conventionally opened, screen-up position, with the folded arm placed next to the base's left back edge 82 (from the user's point of view).

Figure 10:
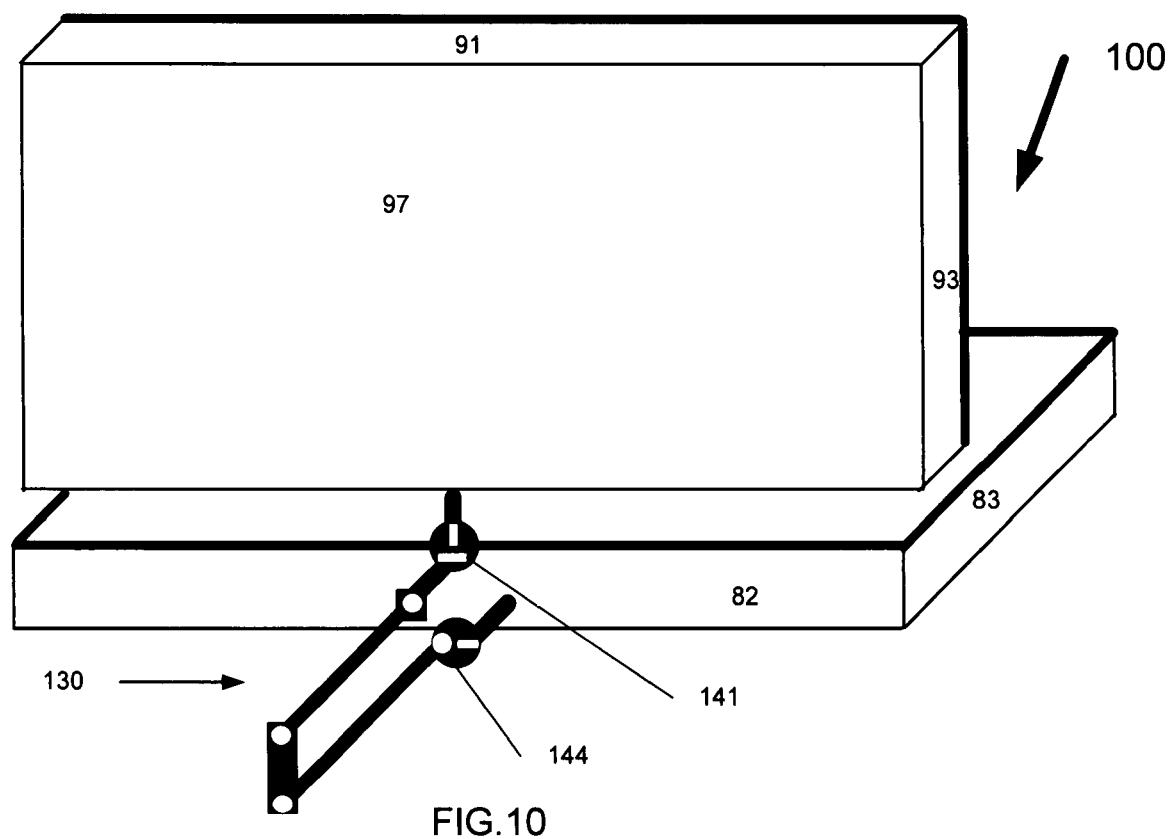

FIG. 10 is a perspective view of computer 100 in a conventionally opened, screen-up position, with the folded arm placed away from the base's back edge 82.

Figure 11:
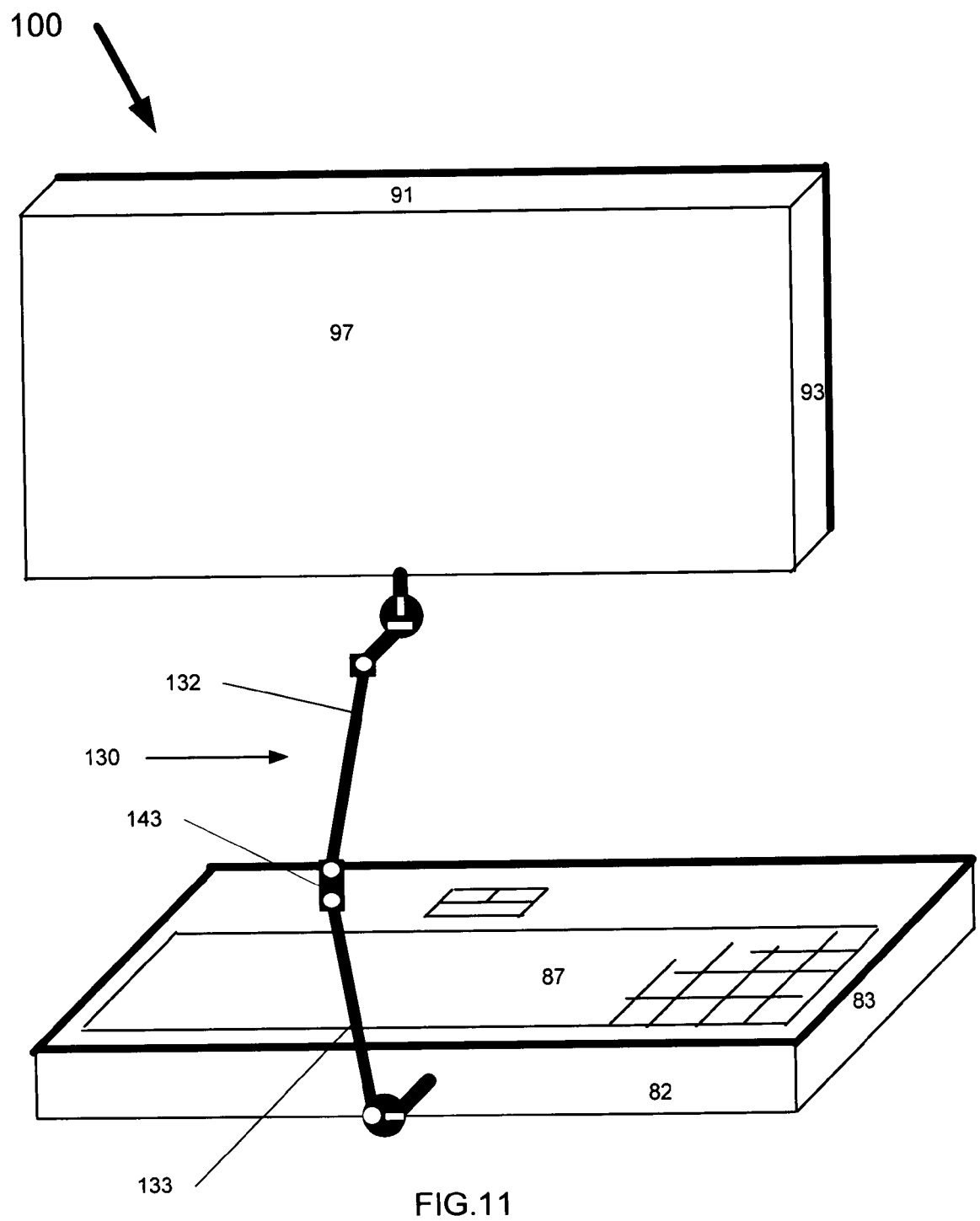

FIG. 11 is a perspective view of computer 100 in a position where the display is up-lifted, screen facing the user, and the arm being away from the back edge 82 of the base.

Figure 12:
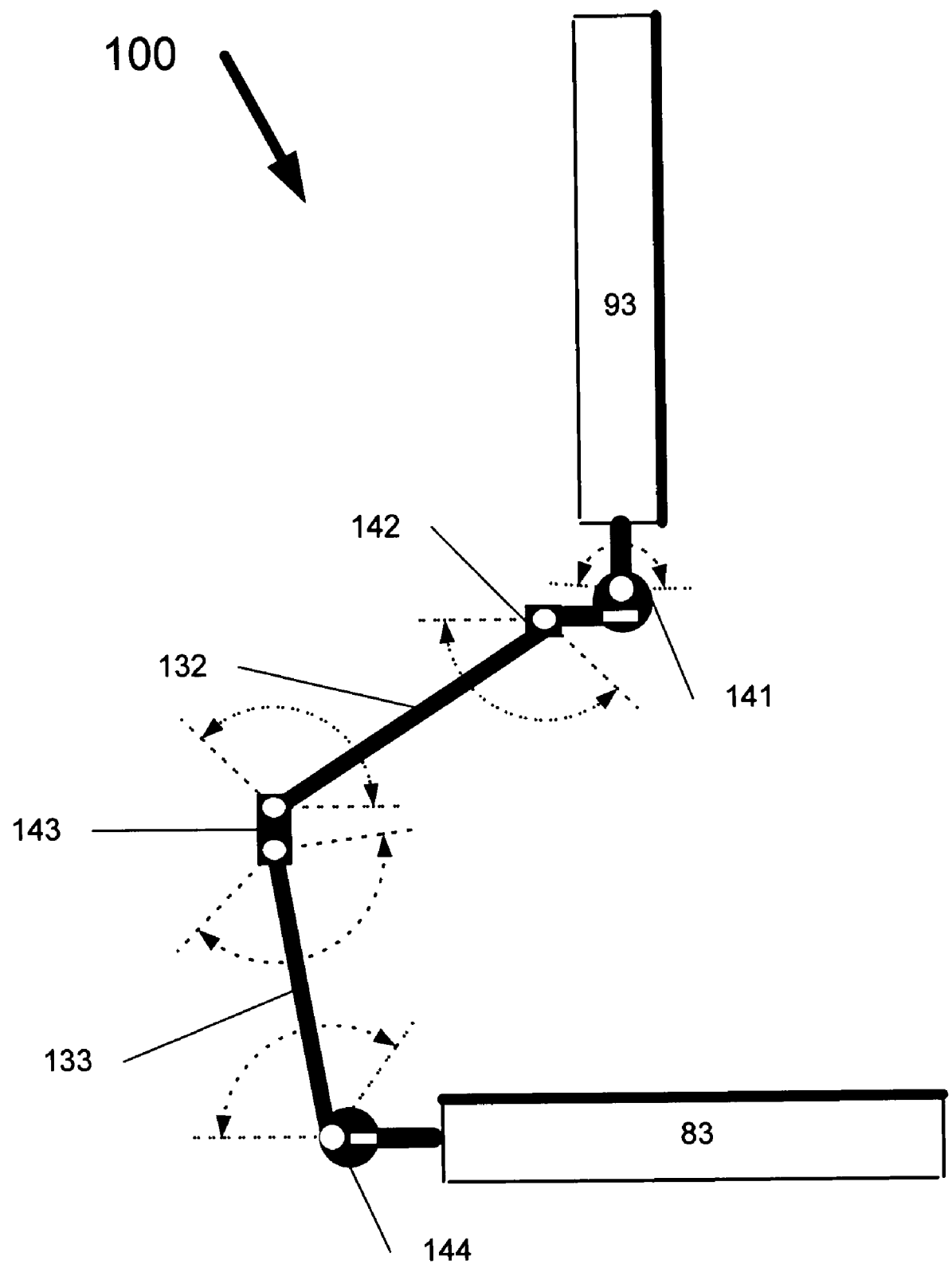

FIG. 12 is a perspective left side view of computer 100 in an opened, screen-up position, where the screen is away from its conventional vertical position towards the user.

Figure 13:
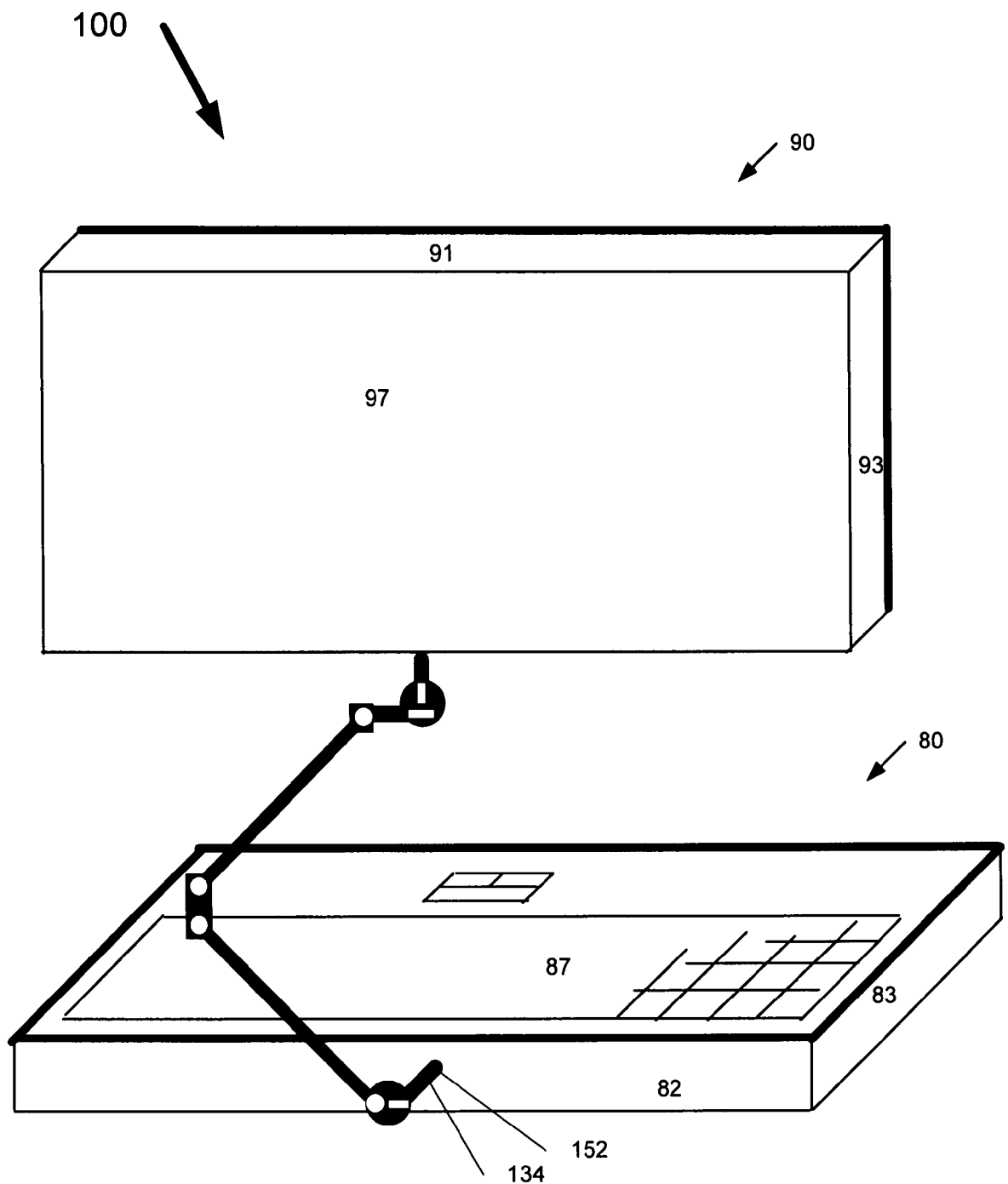

FIG. 13 is a perspective view of computer 100 in an opened, screen-up position, where arm sections 132 and 133 are positioned near the back edge 82 of the base.

Figure 14:
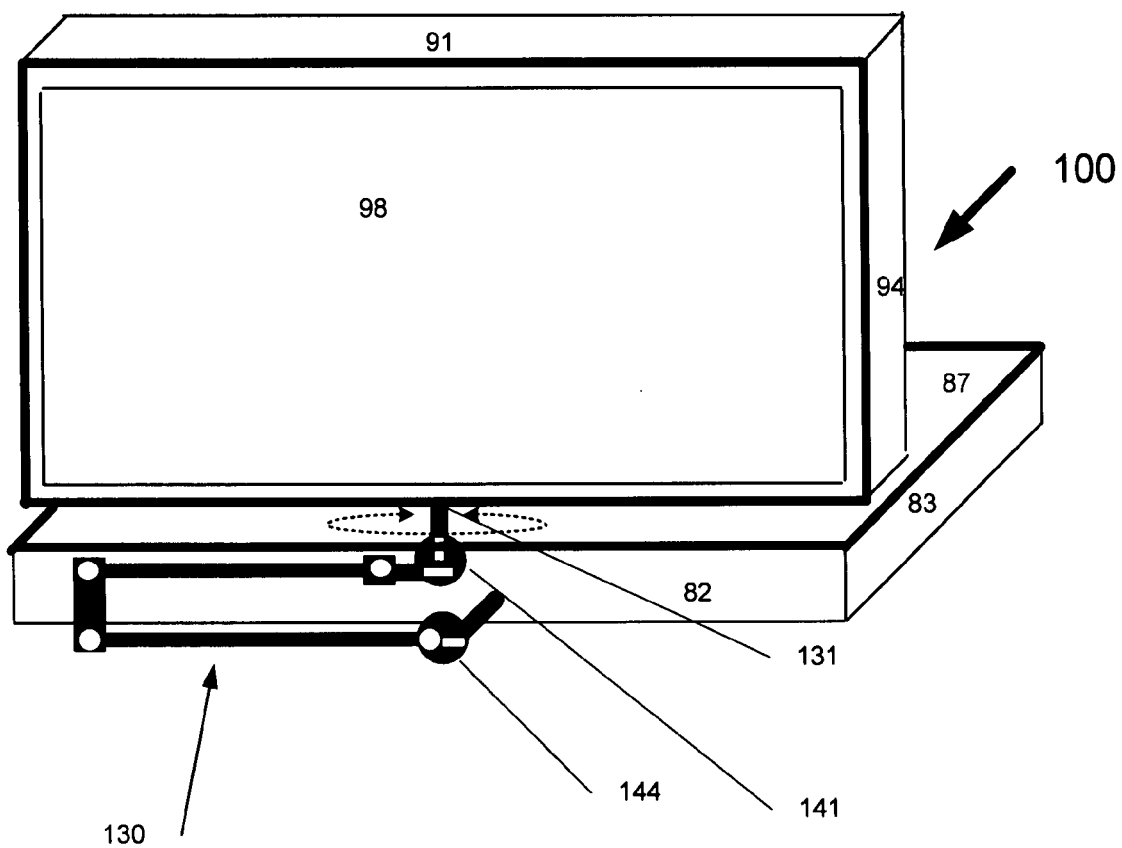

FIG. 14 is a perspective view of computer 100 in an opened, screen-up and backward facing position, where arm sections 132 and 133 are positioned near the back edge 82 of the base.

Figure 15:
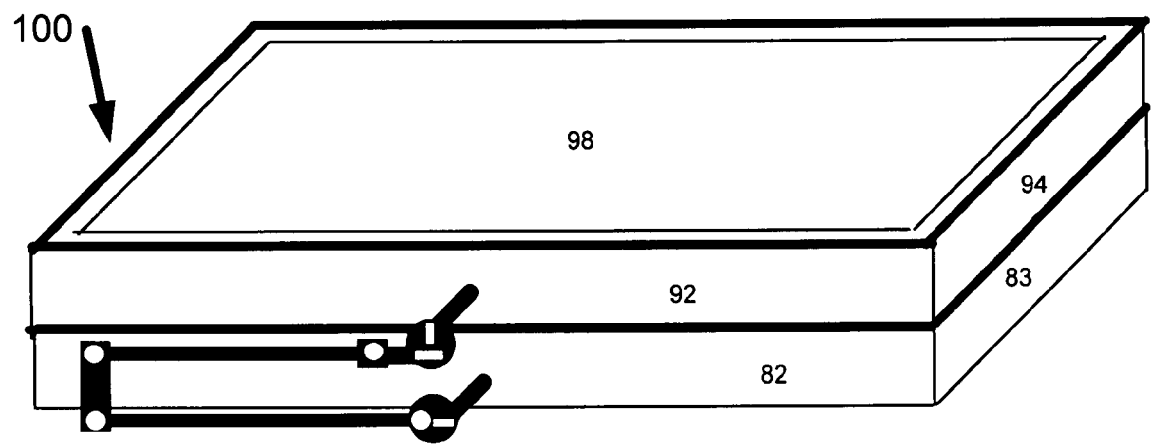

FIG. 15 is a perspective view of computer 100 in a closed position with viewing screen 98 facing upward (for the tablet PC configuration).

Figure 16:
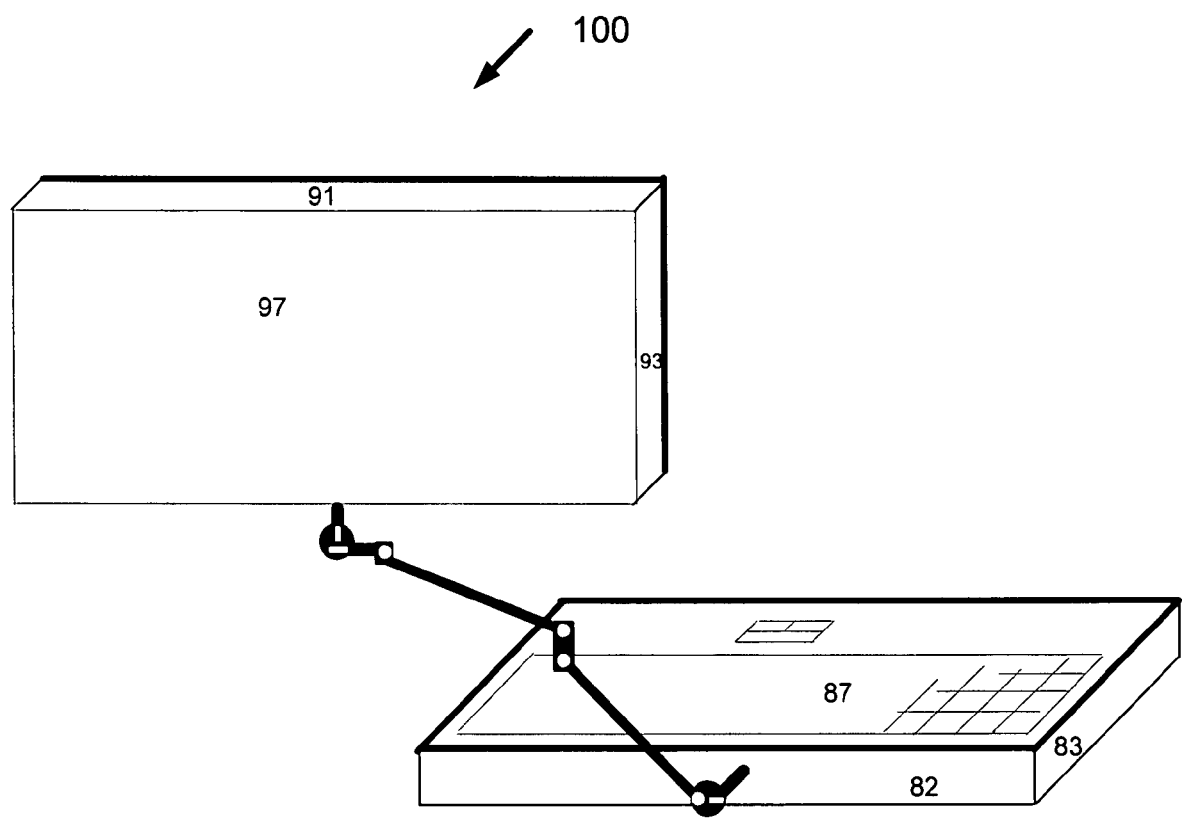

FIG. 16 is a perspective view of computer 100 in an open position in which the viewing screen 98 is facing the front, and the whole display is lifted and positioned towards to the right edge of the user (suitable for view sharing.)

Figure 17:
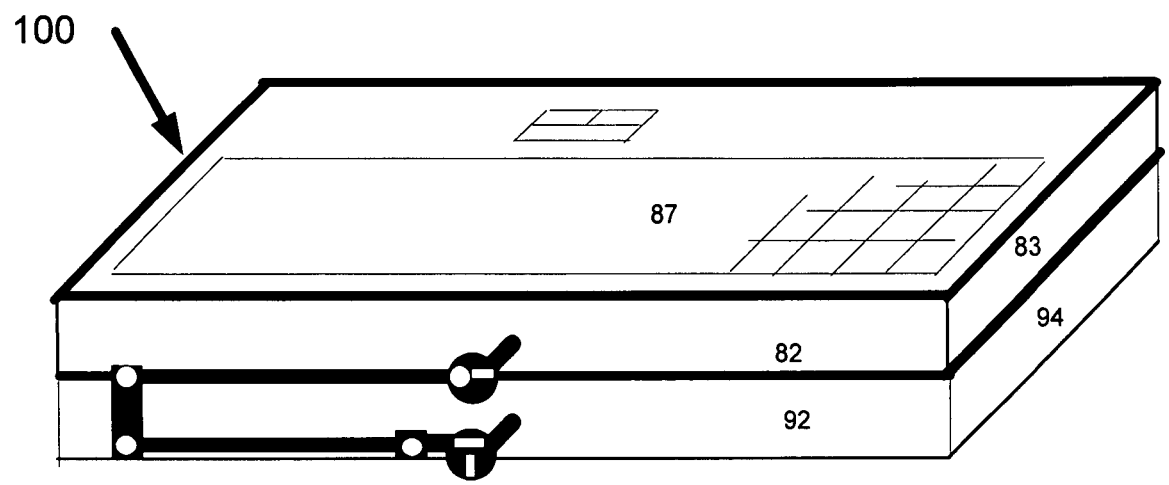

FIG. 17 is a perspective view of computer 100 in a closed position with the base sitting on top of the display (for the space-saving configuration).

Second Embodiment

Figure 18A:
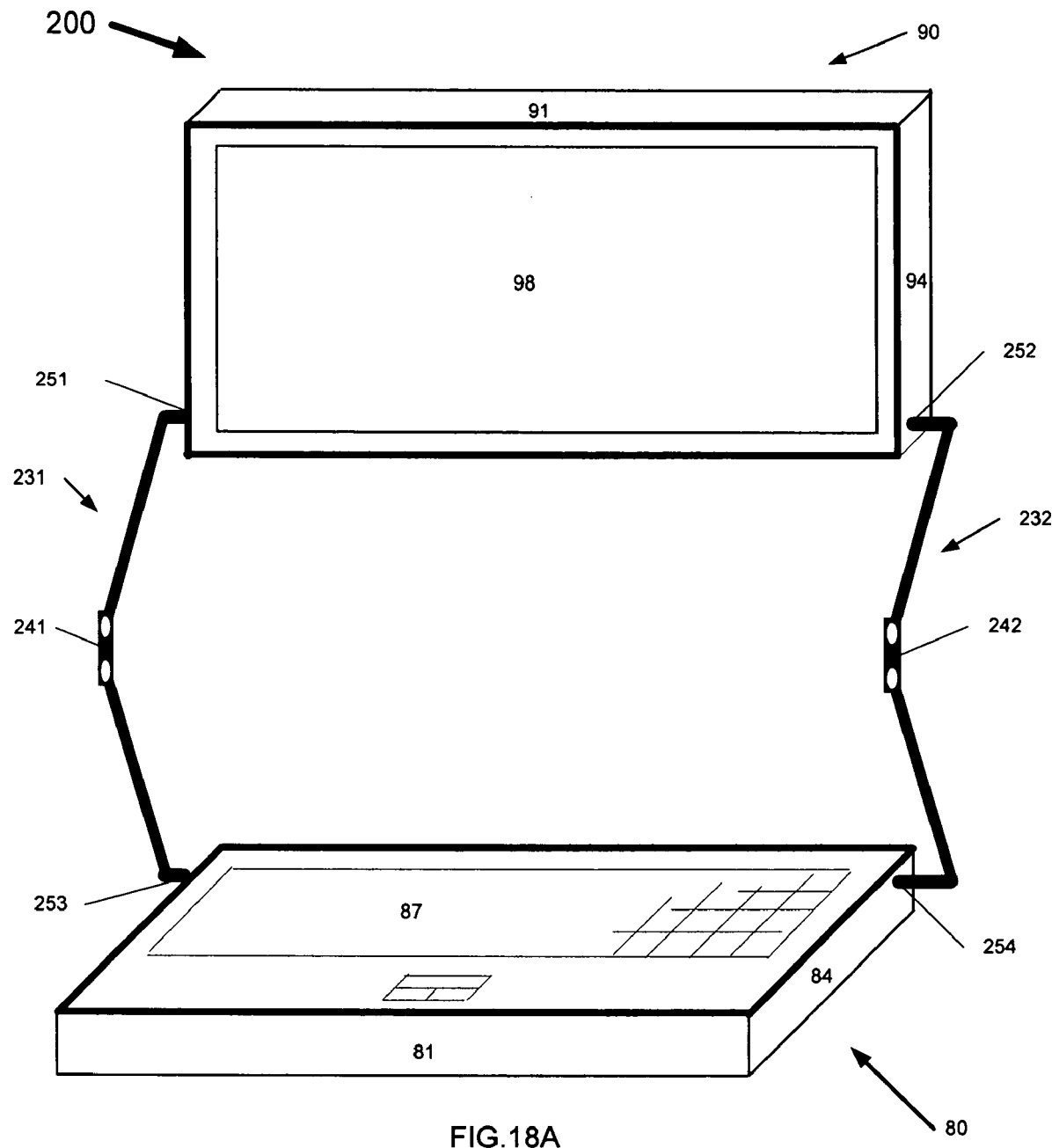

FIG. 18A is a perspective view of the portable computer (200) of the second embodiment of the present invention with two double-sectioned side arms. It is in a position where the screen is lifted and facing the user.

Figure 18B:
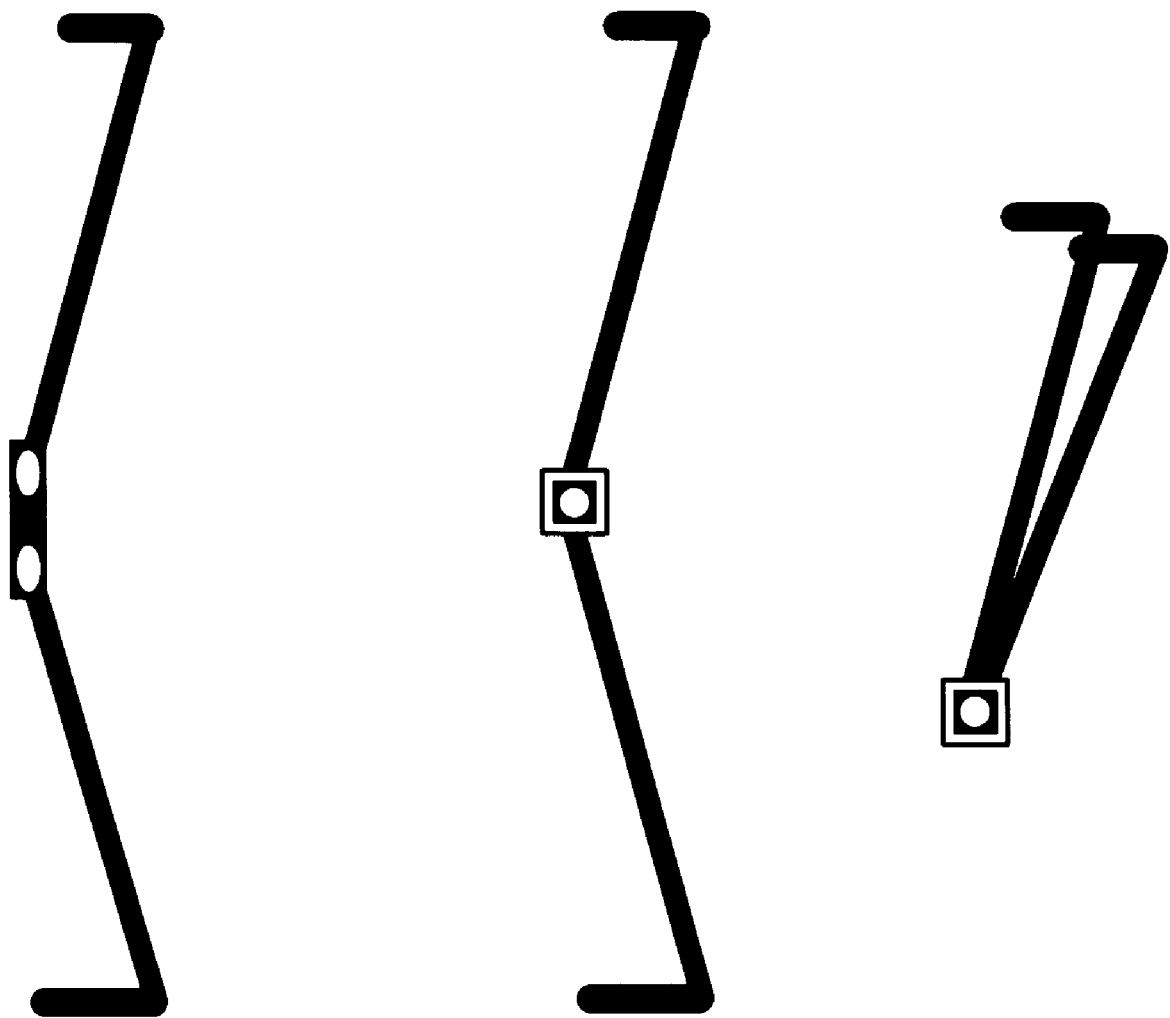

FIG. 18B is a split view of arm 232 of computer 200 and an alternative arm design.

Figure 19:
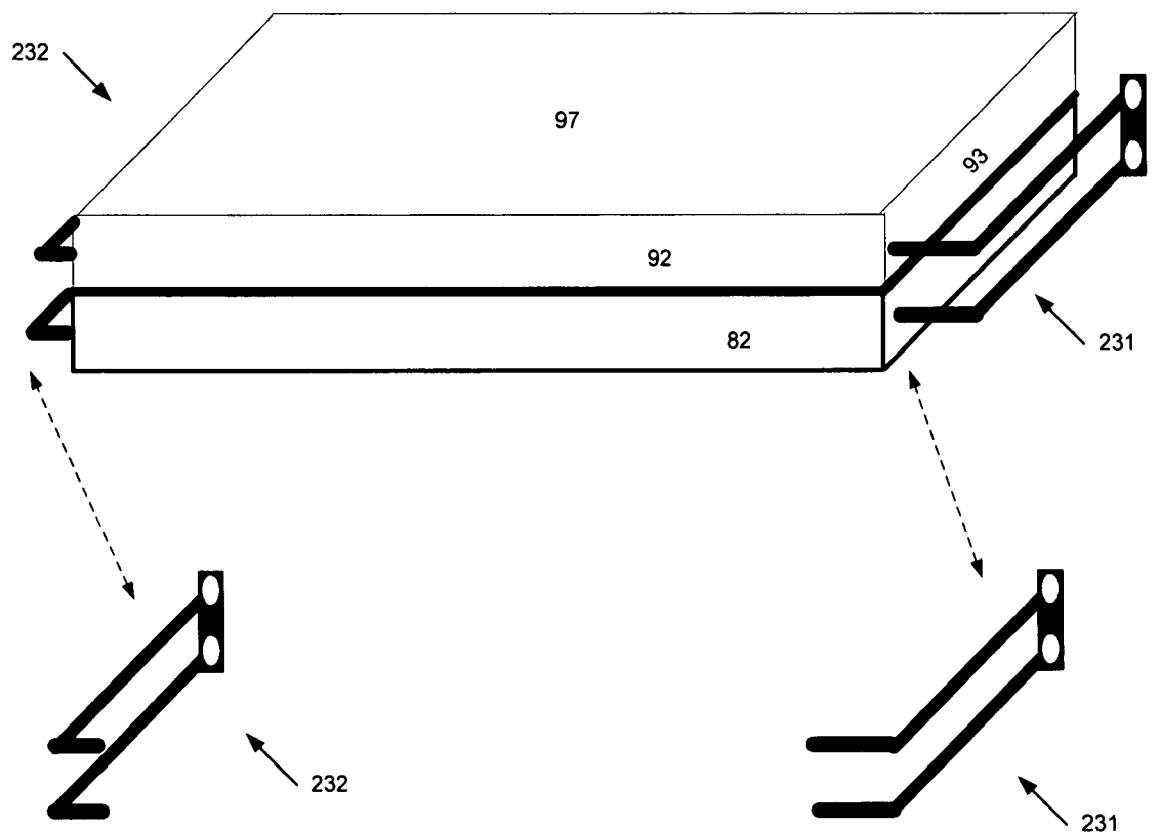

FIG. 19 is a perspective view of computer 200 in a closed, arms folded position. It also shows how the arms can be detached.

Figure 20:
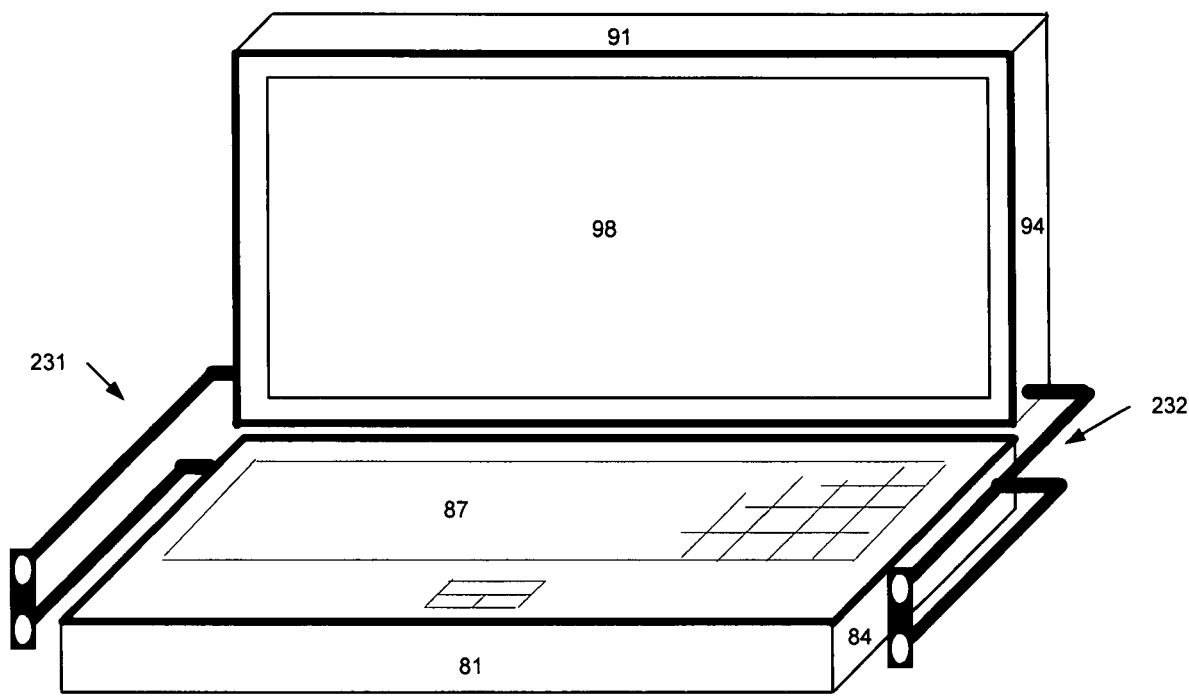

FIG. 20 is a perspective view of computer 200 in conventional open position.

Figure 21:
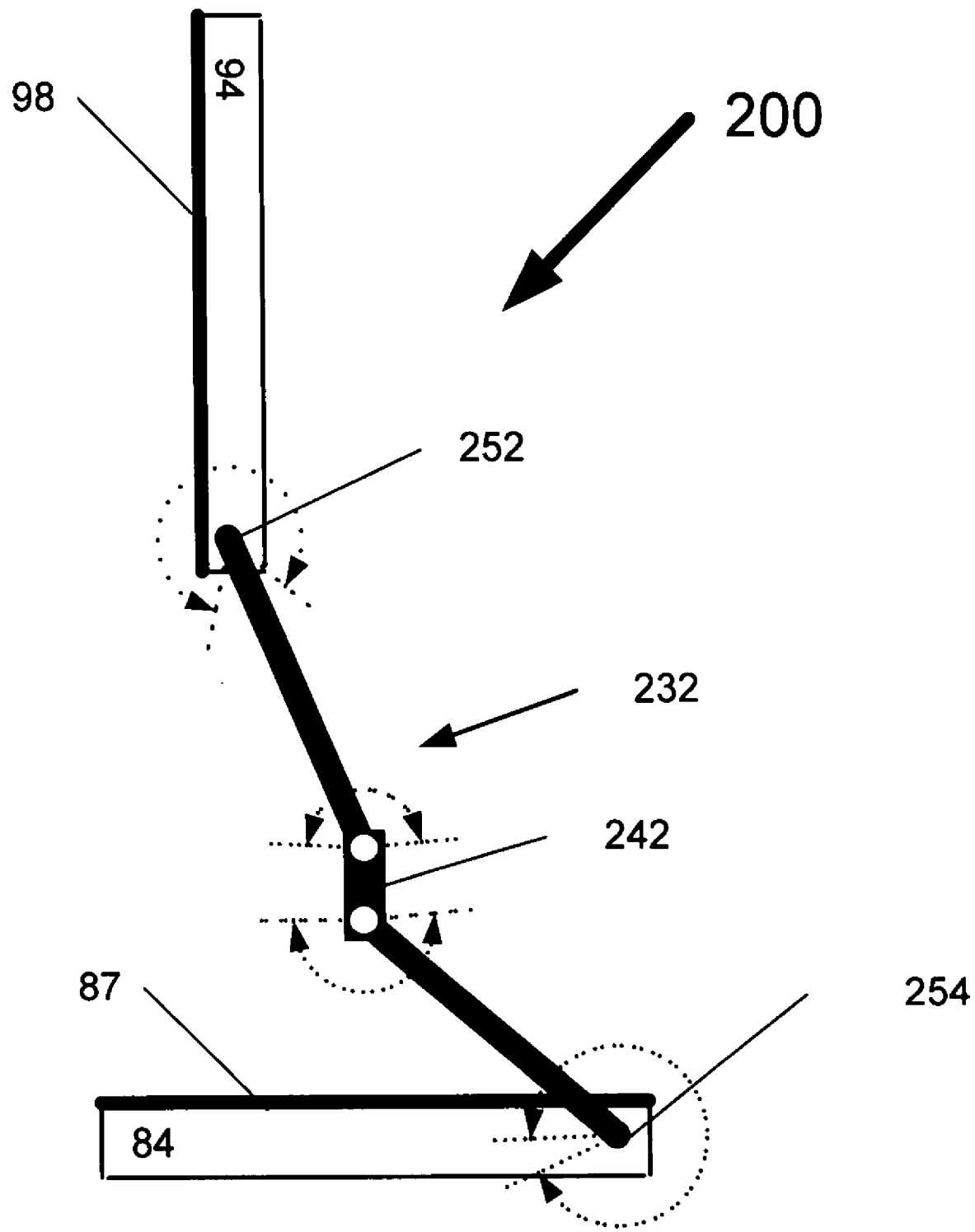

FIG. 21 is perspective side view of computer 200 in a position with the screen up-lifted and facing the user.

Figure 22:
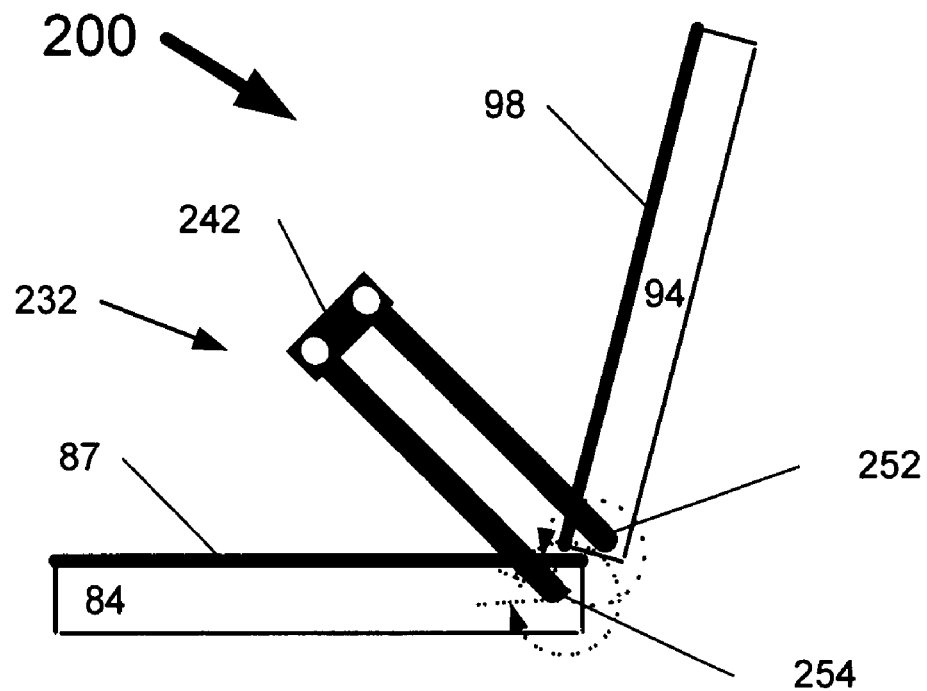

FIG. 22 is a perspective side view of computer 200 in a conventional open position with arms folded and lifted up to avoid blocking side edge 84 of the base for other uses such as a DVD player and other outlets.

Figure 23:
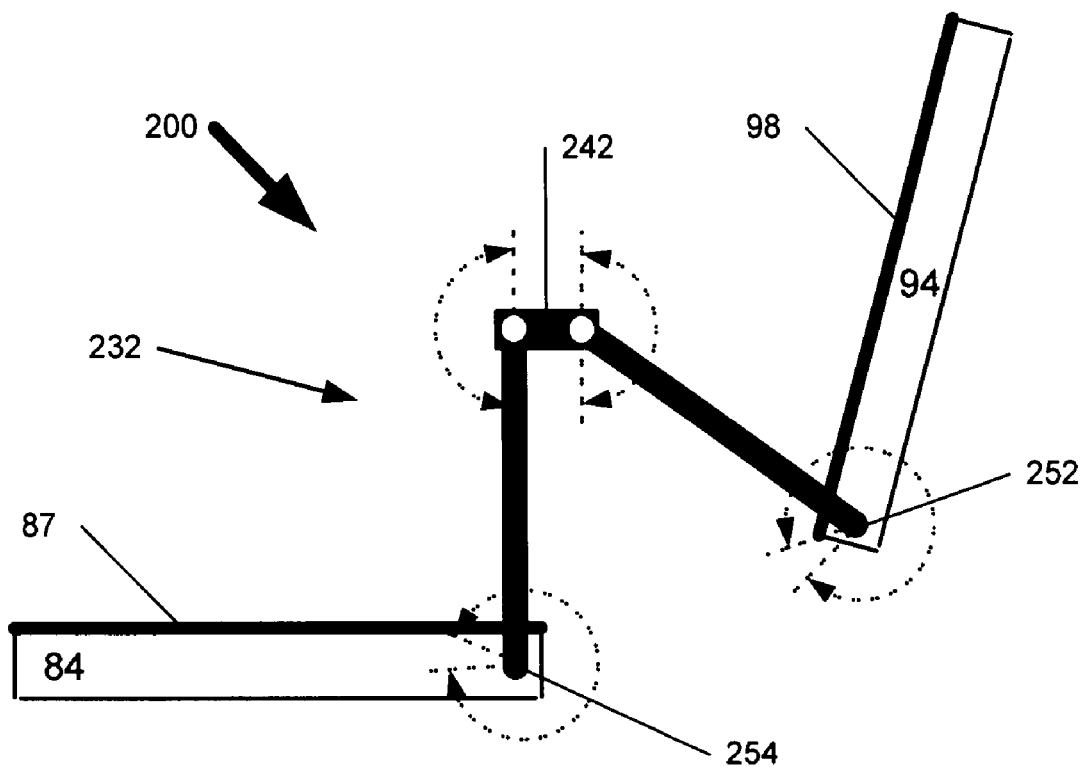

FIG. 23 is a perspective side view of computer 200 in an unconventional open position with arms partially stretched to reach behind the back edge of the base. (This is to show how flexible the display's viewing position can be.)

Figure 24:
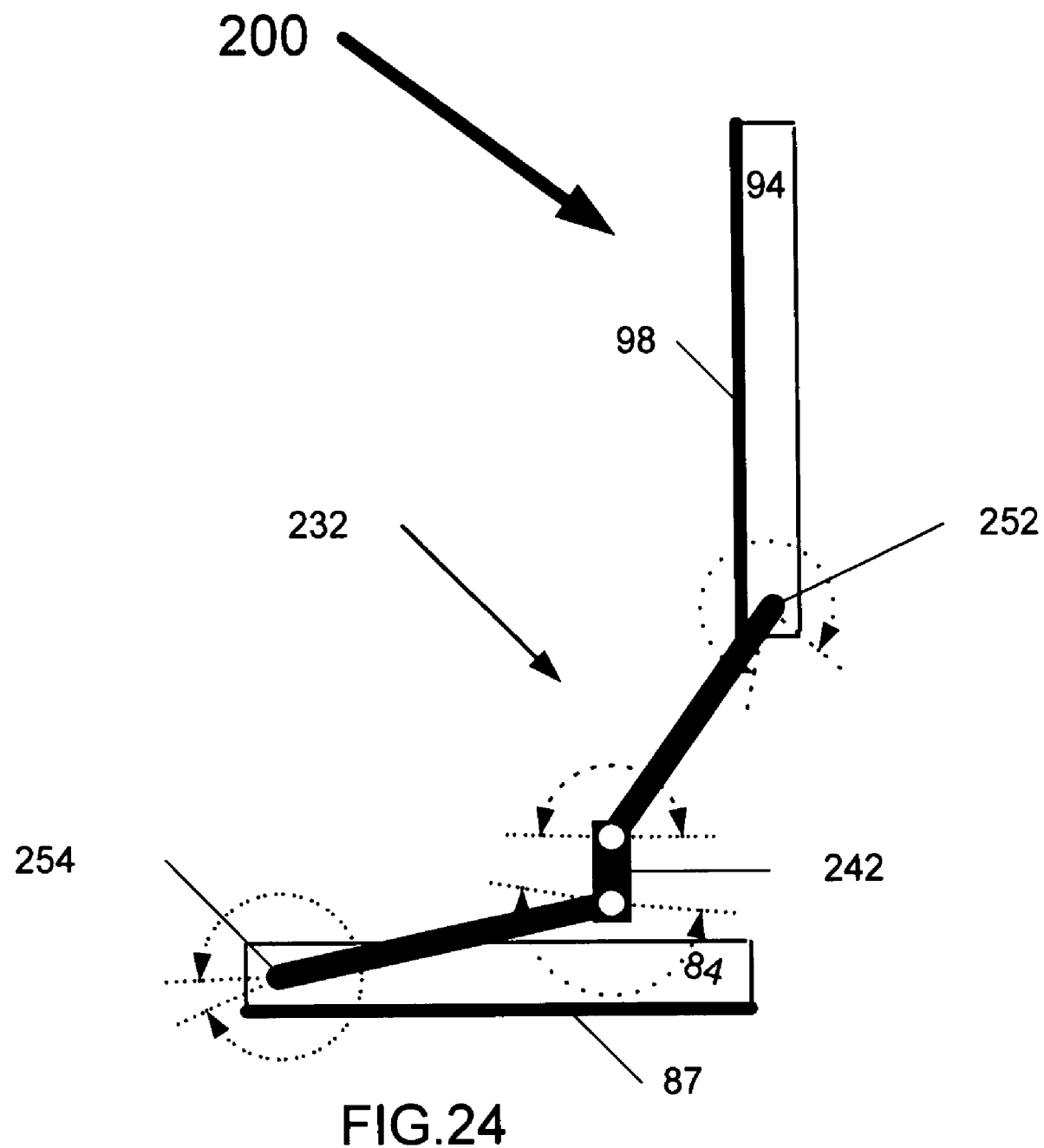

FIG. 24 is a perspective side view of computer 200 in an open position with display 90 up-lifted and the keyboard faced down (for the stylus configuration (4)).

Figure 25:
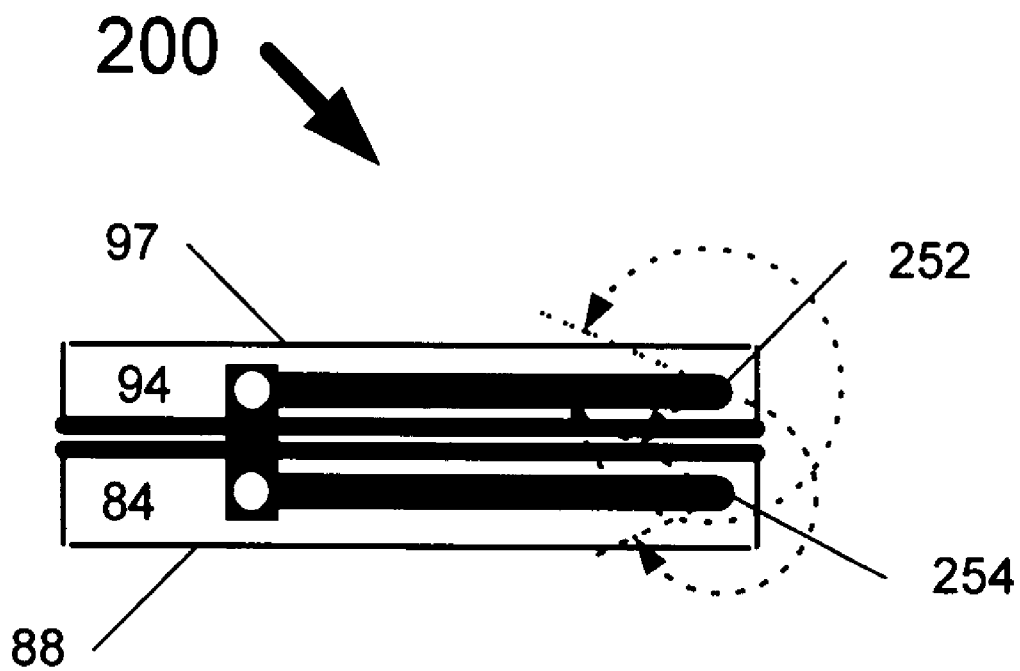

FIG. 25 is a perspective side view of computer 200 in a conventional closed position with arms folded and screen facing the keyboard.

Figure 26:
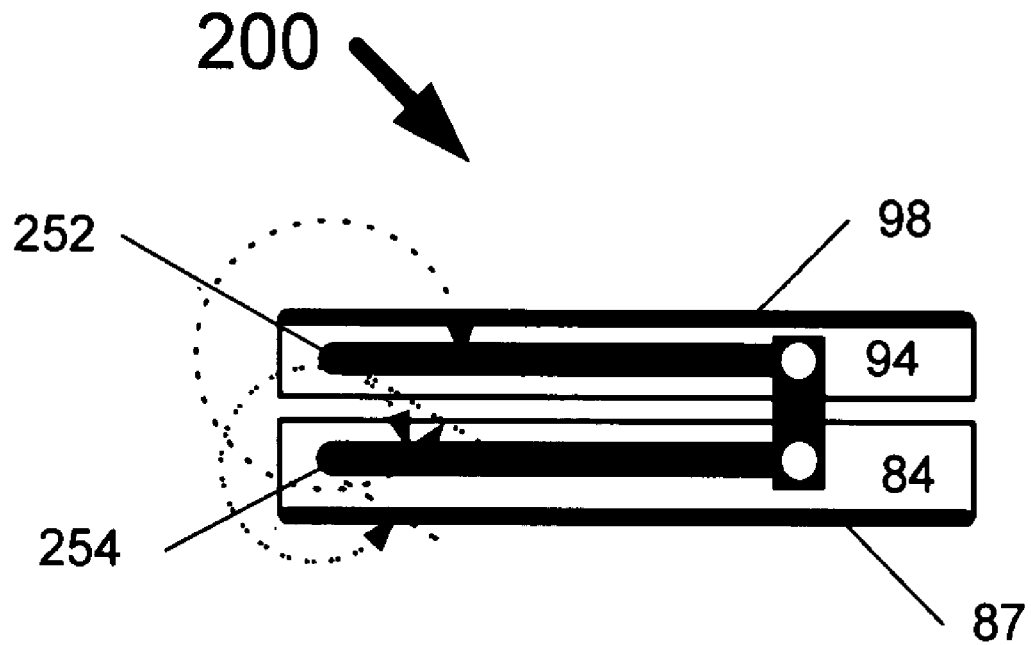

FIG. 26 is a perspective side view of computer 200 in a closed position with arms folded, screen facing up, and the based stacked underneath the display. (This is a version of the tablet PC configuration.)

Figure 27:
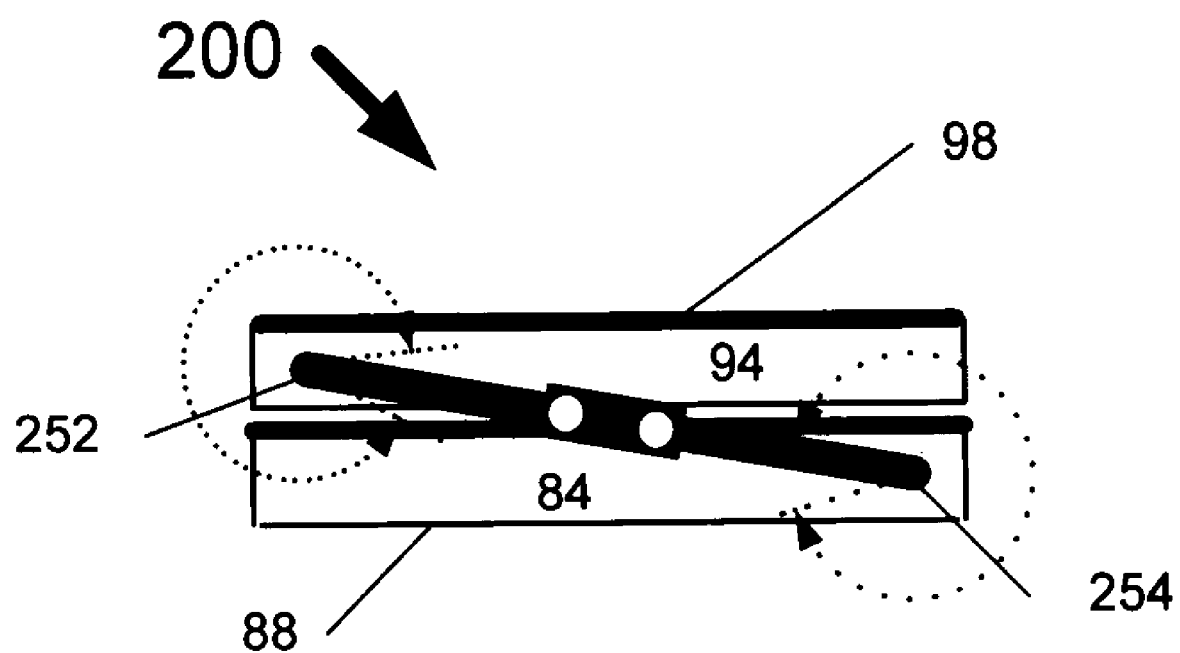

FIG. 27 is a perspective side view of computer 200 in a closed position with arms stretched and screen facing up. (This is an alternative design to support the tablet PC configuration. In this special design, the length of arm 232 can not exceed the length of side edge 84.)

Third Embodiment

Figure 28A:
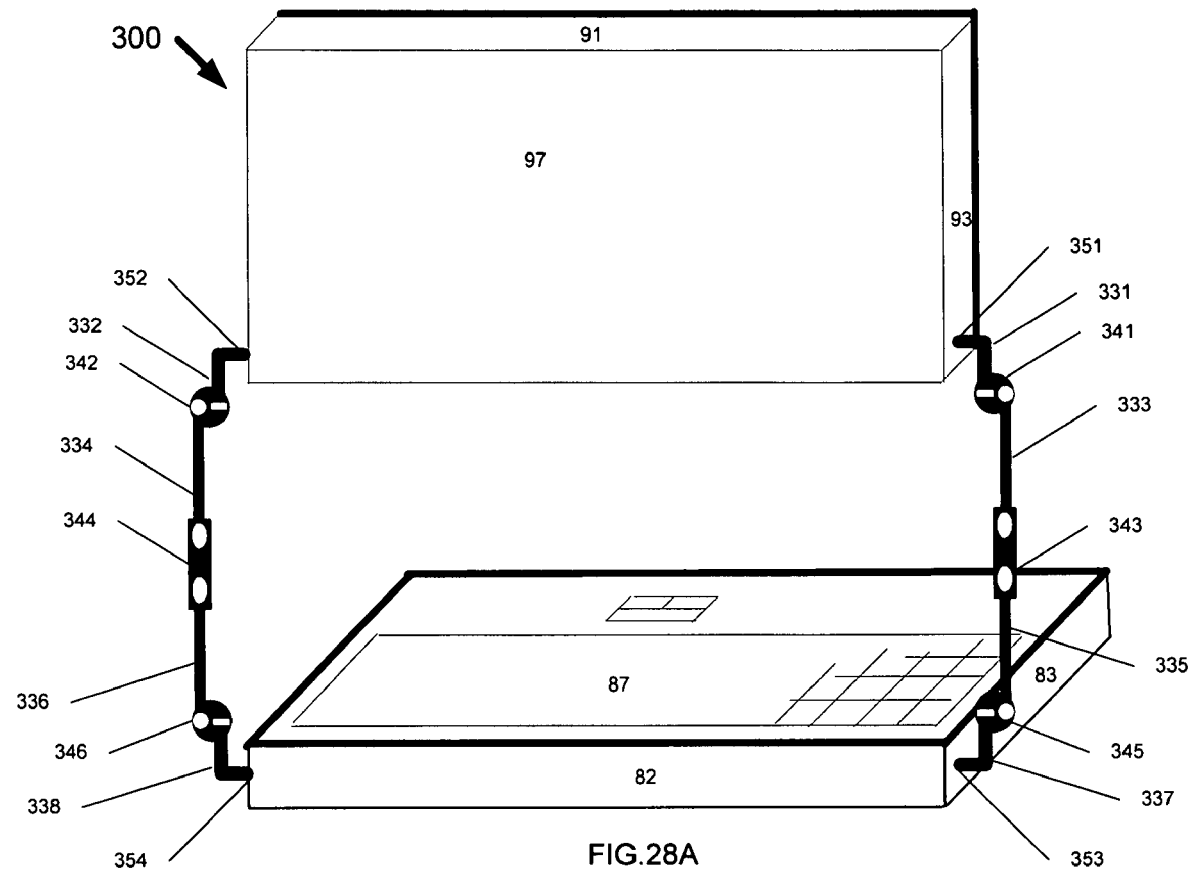

FIG. 28A is a perspective view of a portable computer (300) of the third embodiment of the present invention.

Figure 28B:
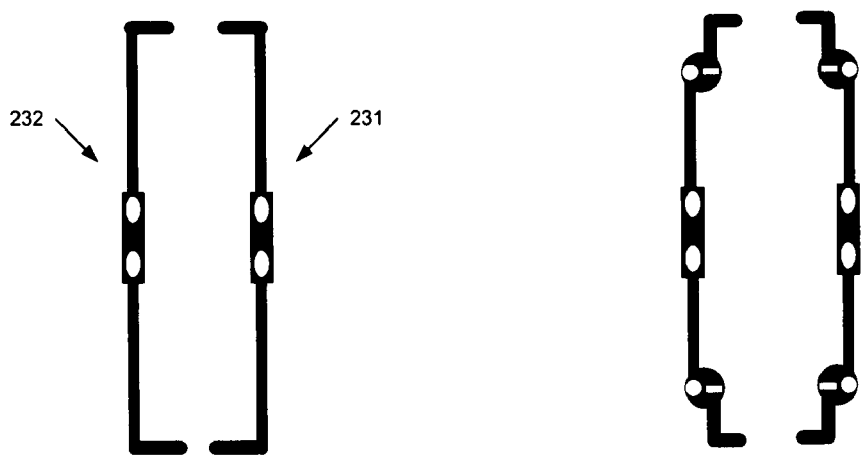

FIG. 28B is a split view of arms 231 and 232 of computer 200 and an alternative pair of arms. Substituting the arms leads to the third embodiment of the present invention as shown in FIG. 28A.

Figure 29:
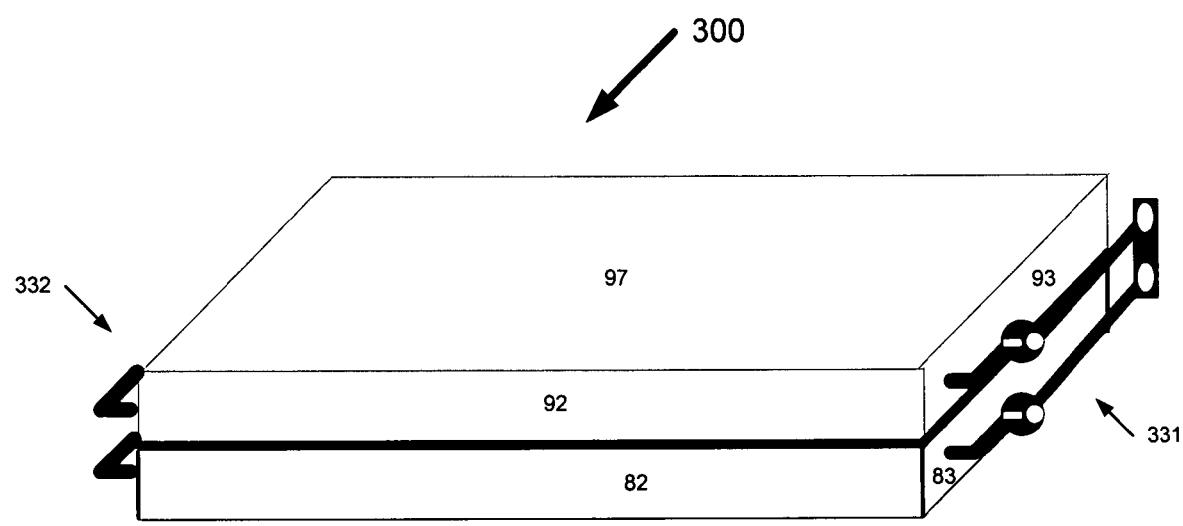

FIG. 29 is a perspective view of portable computer 300 in a closed position, with the arms folded.

Figure 30:
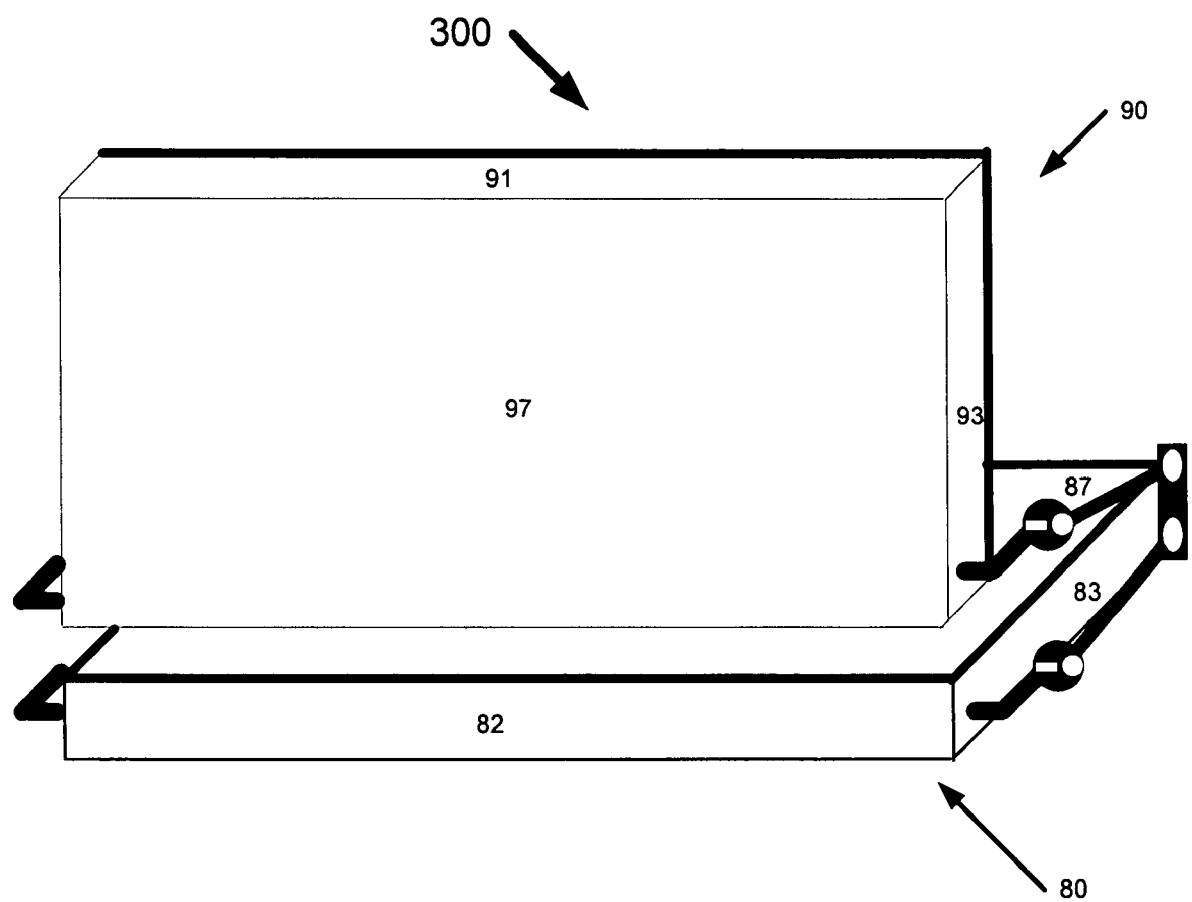

FIG. 30 is a perspective view of portable computer 300 in a conventional open position, with arms folded and parked alongside the edges of the base (80).

Figure 31:
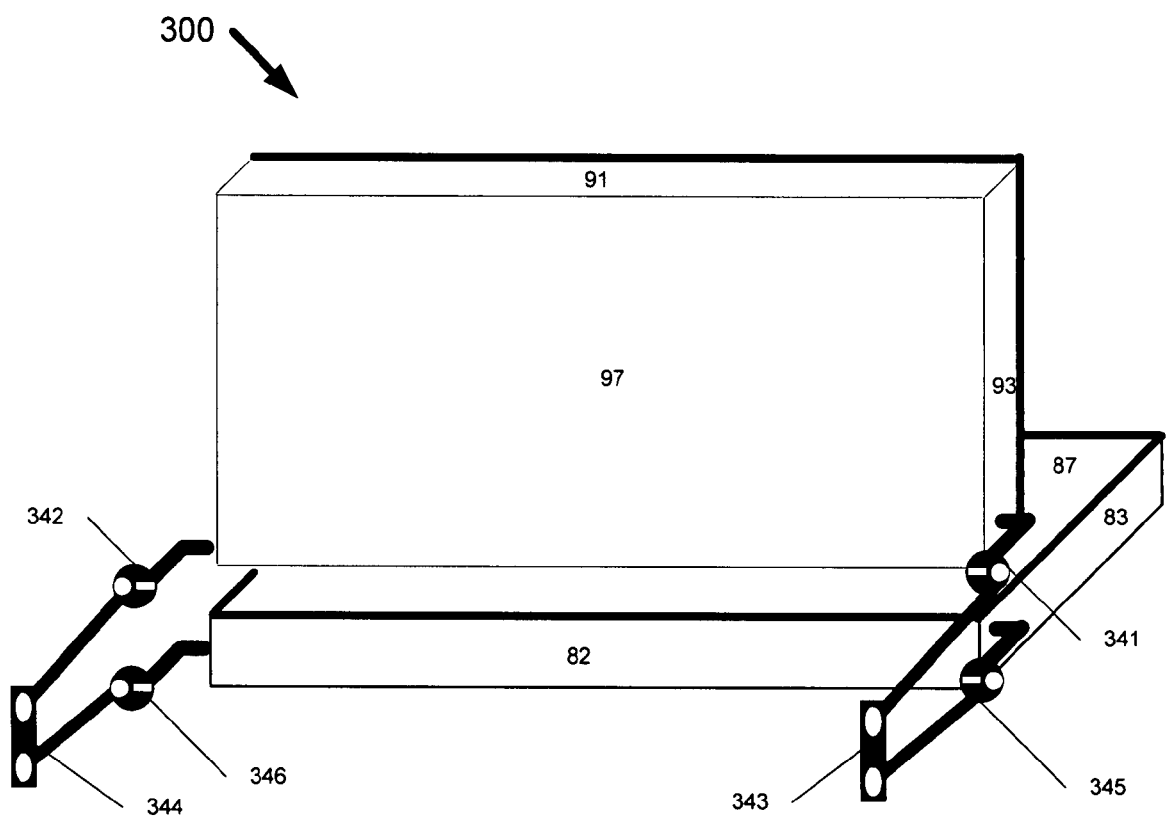

FIG. 31 is a perspective view of portable computer 300 in an open position, with arms folded and reached out from the back of the computer.

Figure 32:
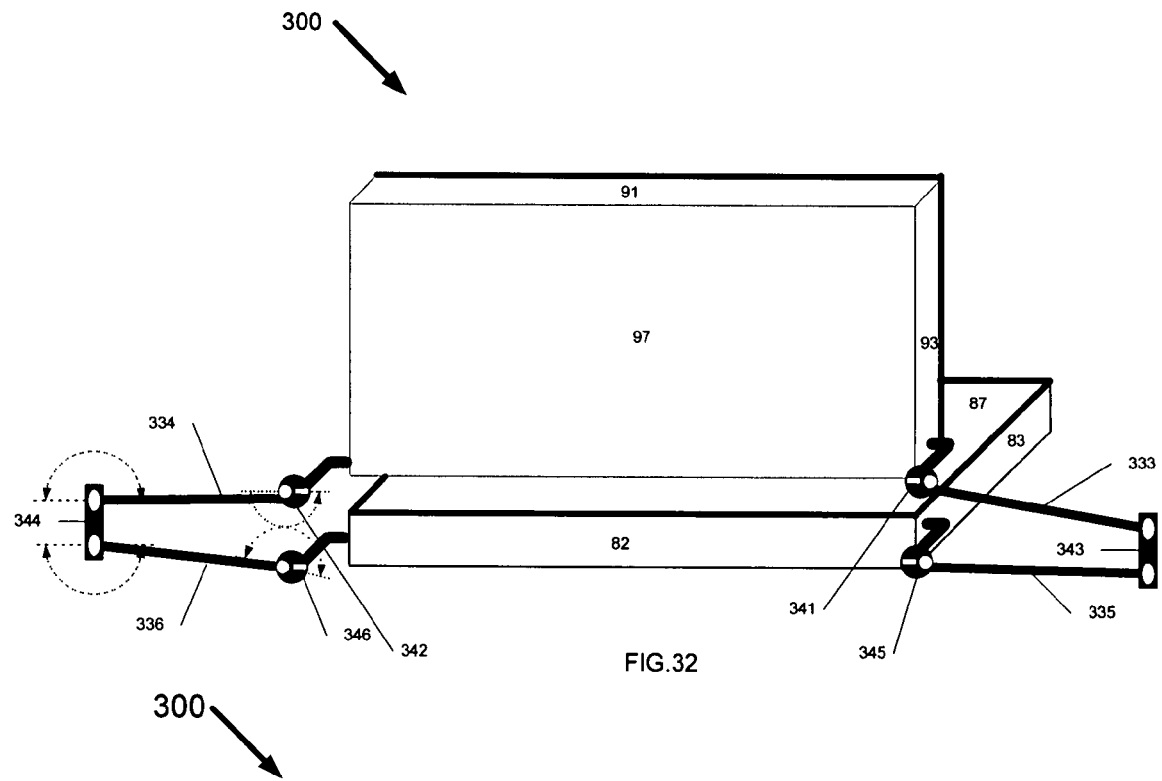

FIG. 32 is a perspective view of portable computer 300 in an open position, with arms folded, reached out first from the back of the computer, and then turned sideway away from the computer.

Figure 33:
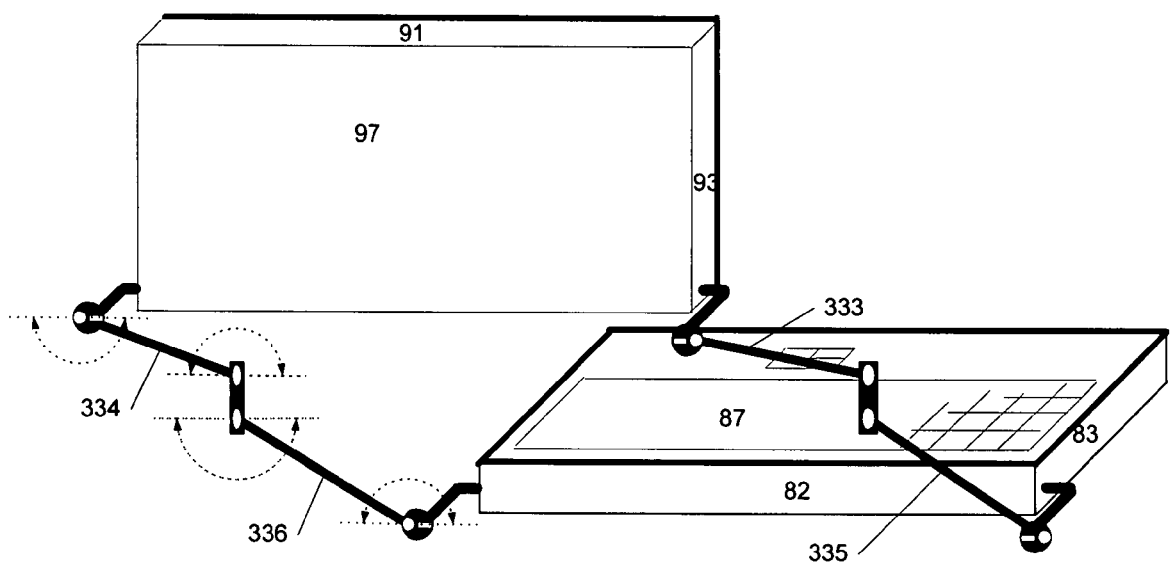

FIG. 33 is a perspective view of portable computer 300 in an open position, with arms partially stretched, and with the display partially up-lifted and reached out towards the right hand side of the computer (from the user's point of view.)

Fourth Embodiment

Figure 34A:
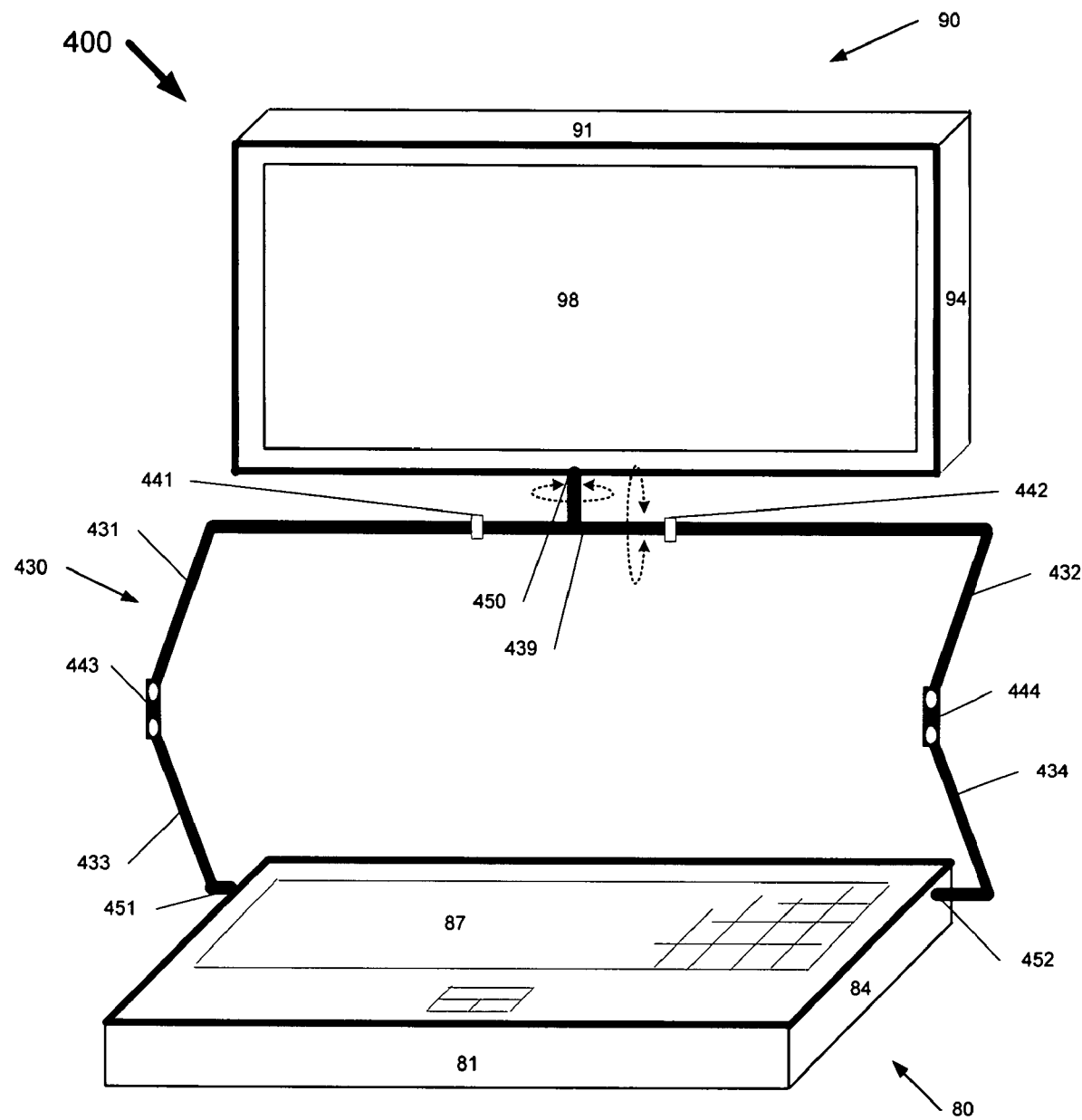

FIG. 34A is a perspective view of the portable computer (400) of the fourth embodiment of the present invention. This embodiment has one multi-sectioned bridge arm. It is in a position where the screen is lifted and facing the user.

Figure 34B:
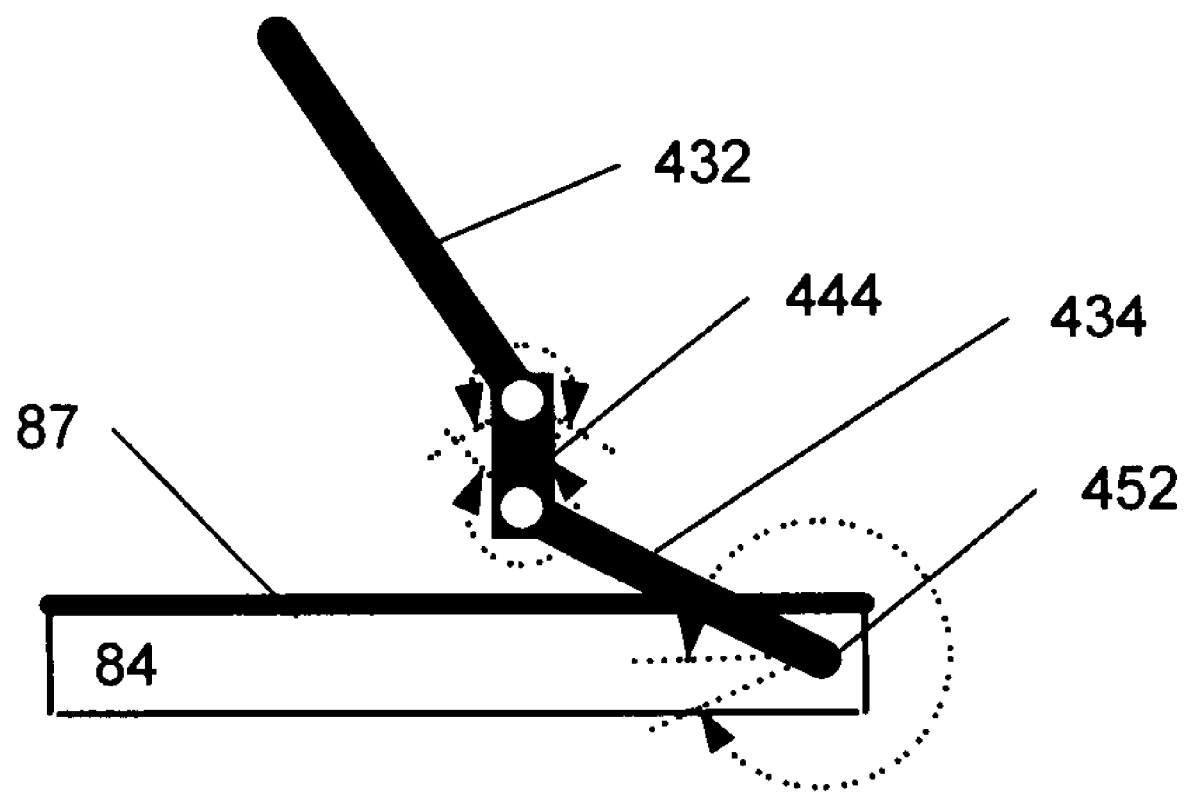

FIG. 34B is a perspective side view of a portion of computer 400.

Figure 35:
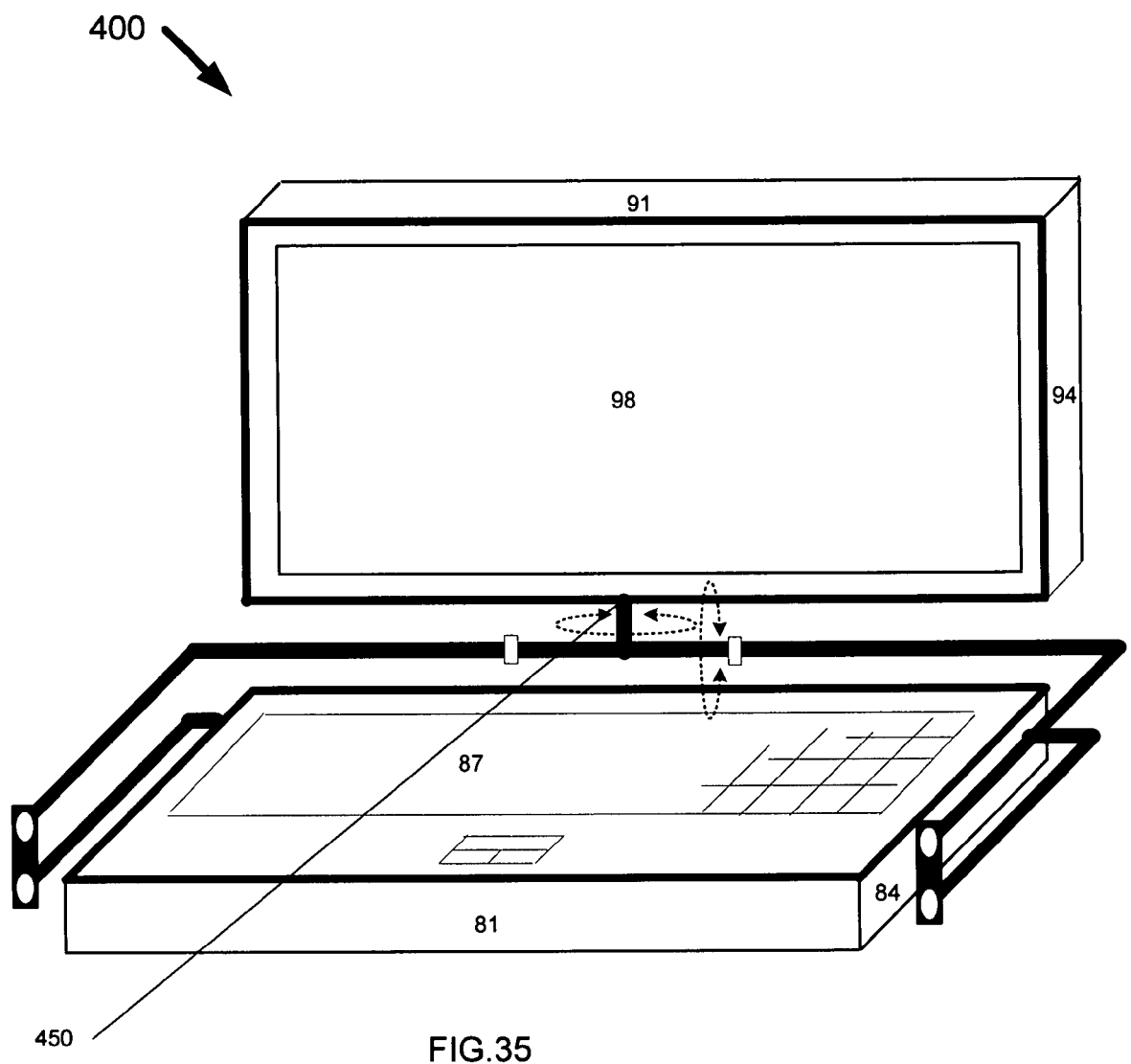

FIG. 35 is a perspective view of computer 400 in the conventional open position.

Figure 36:
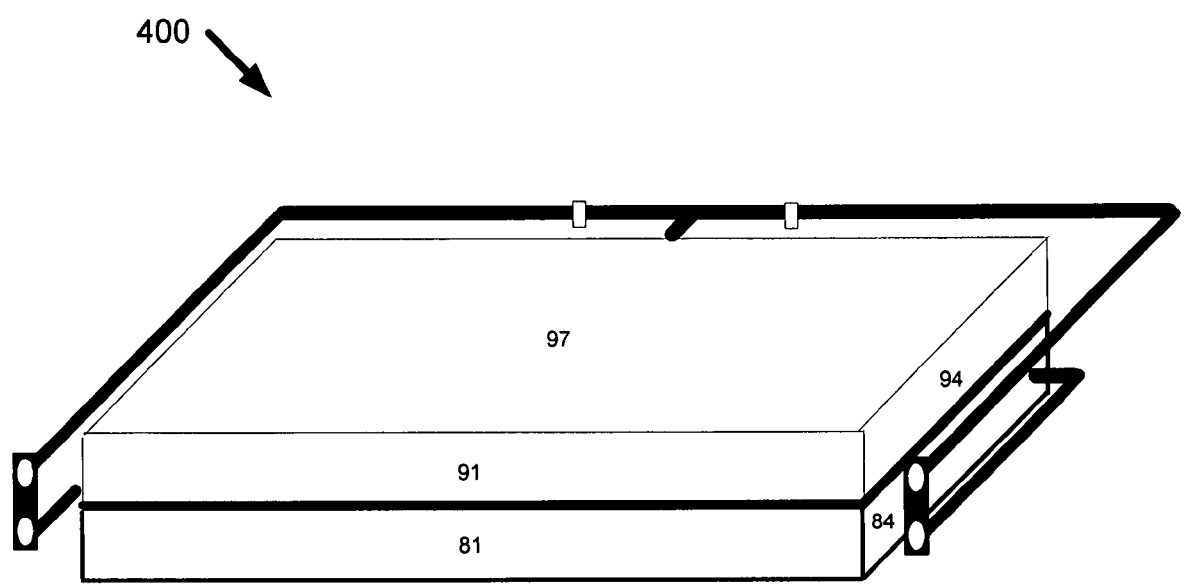

FIG. 36 is a perspective view of computer 400 in the conventional closed position.

Figure 37:
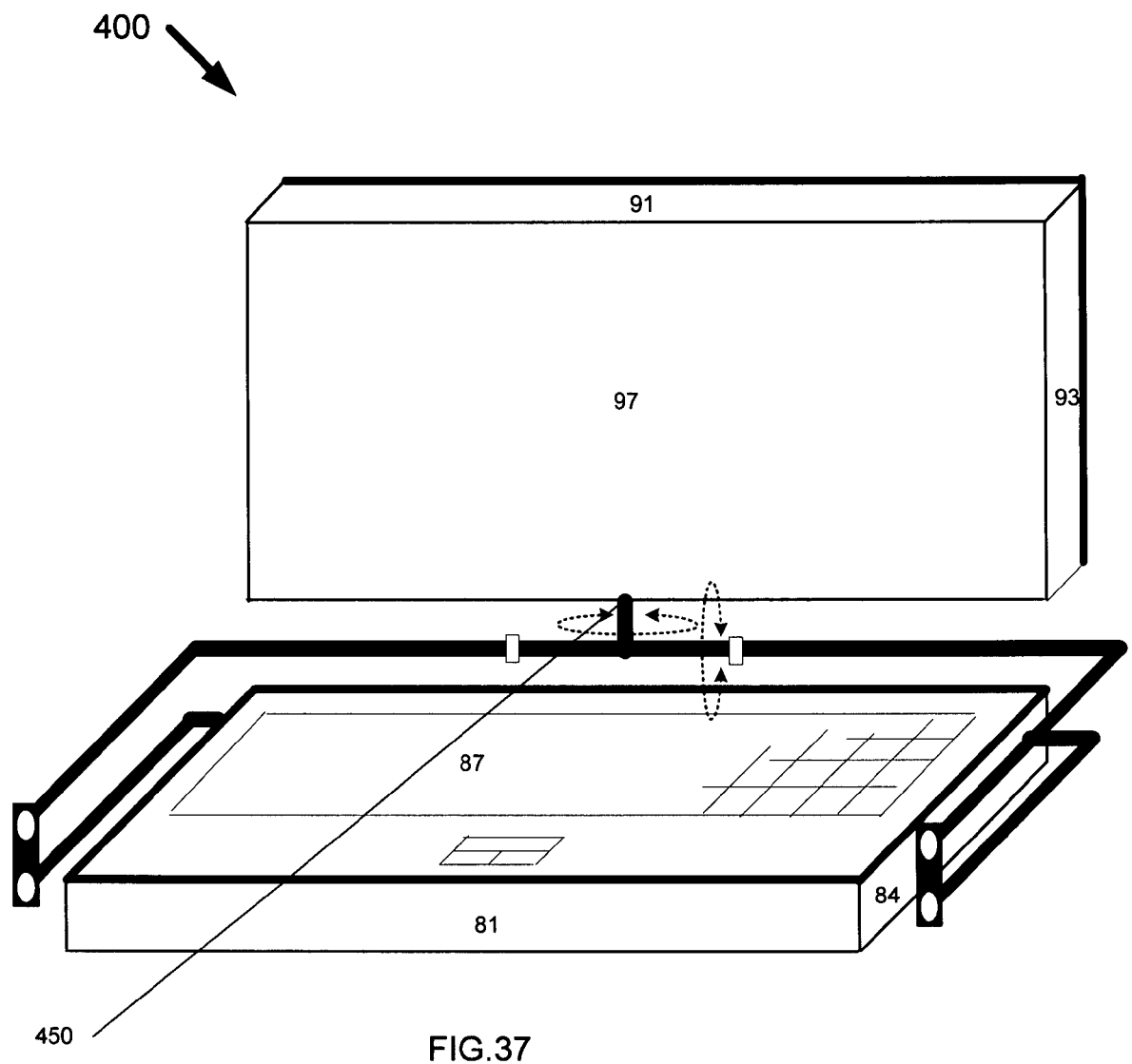

FIG. 37 is a perspective view of computer 400 in an open position with the arm folded and the screen facing away from the user.

Figure 38:
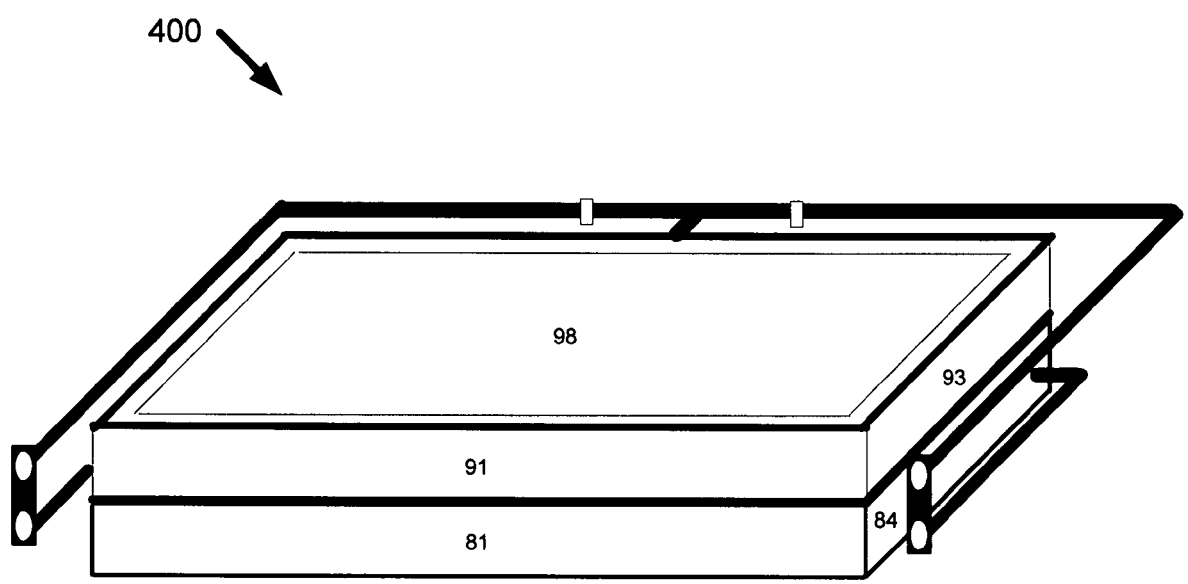

FIG. 38 is a perspective view of computer 400 in a closed position with screen facing upward.

Figure 39:
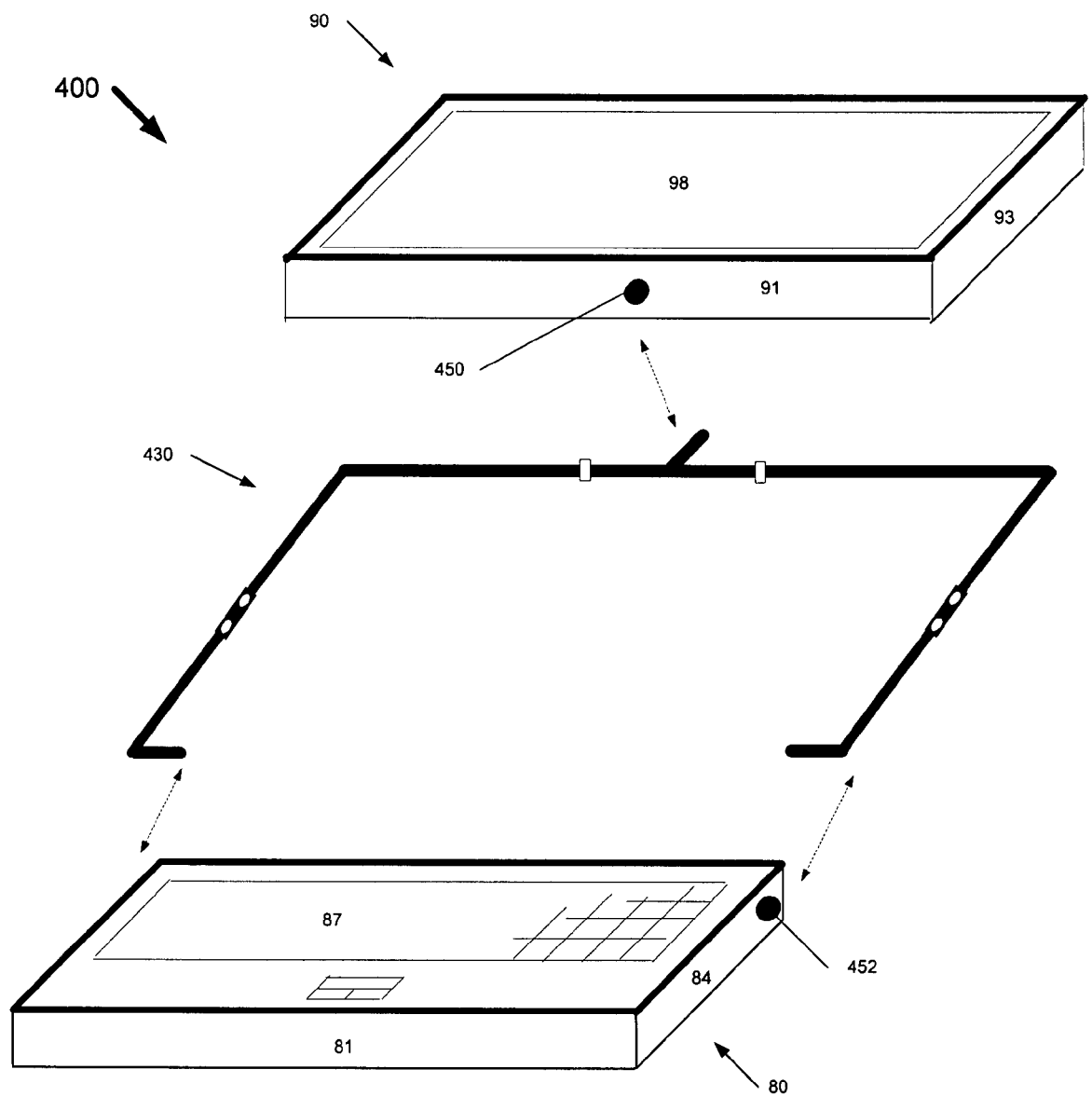

FIG. 39 is a perspective view of computer 400 when the arm is completely detached from base 80 and display 90.

Fifth Embodiment

Figure 40:
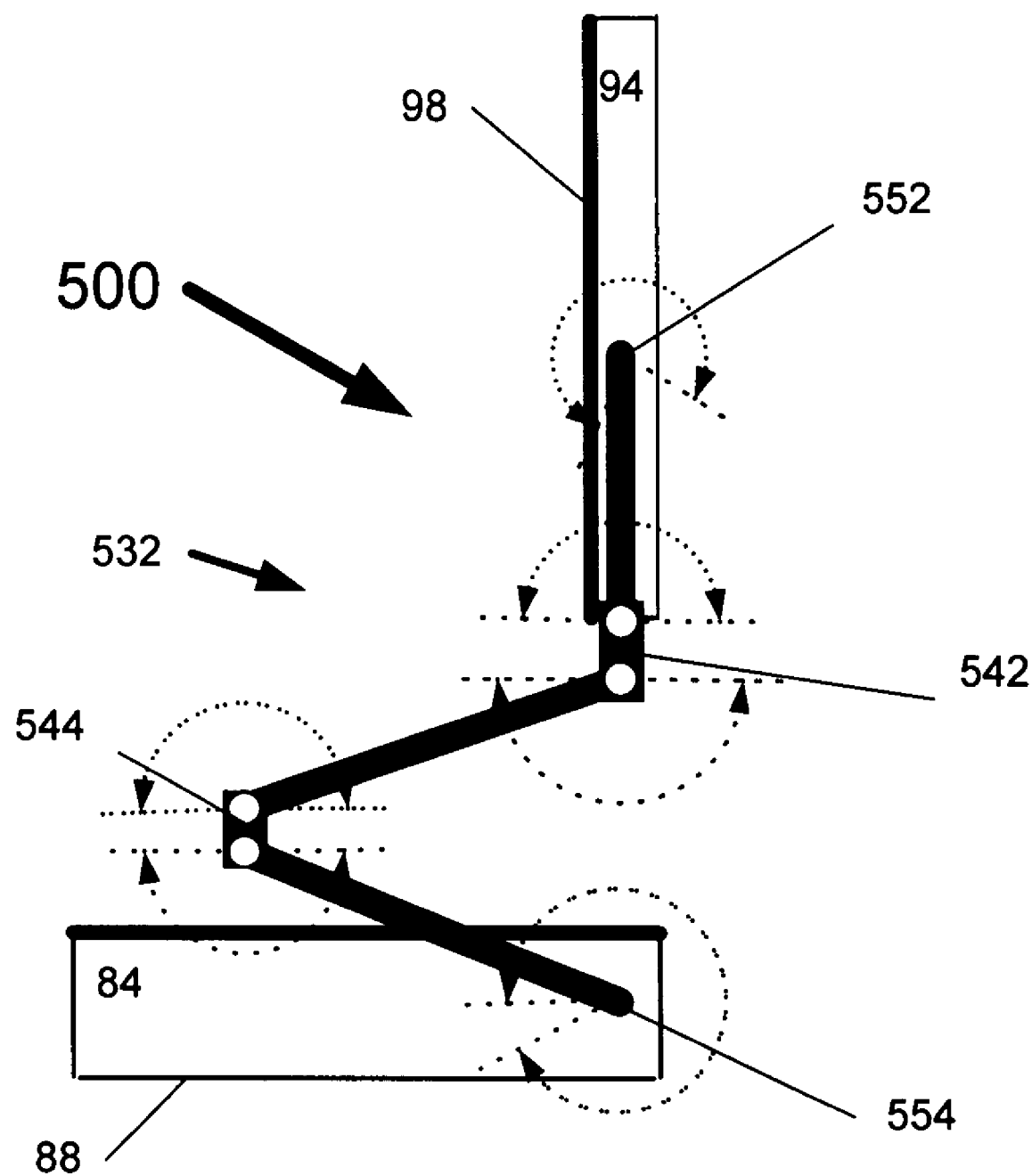

FIG. 40 is a perspective side view of the portable computer (500) of the fifth embodiment of the present invention. This embodiment has two triple-sectioned side arms. It is in a position where the screen is lifted and facing the user.

Figure 41:
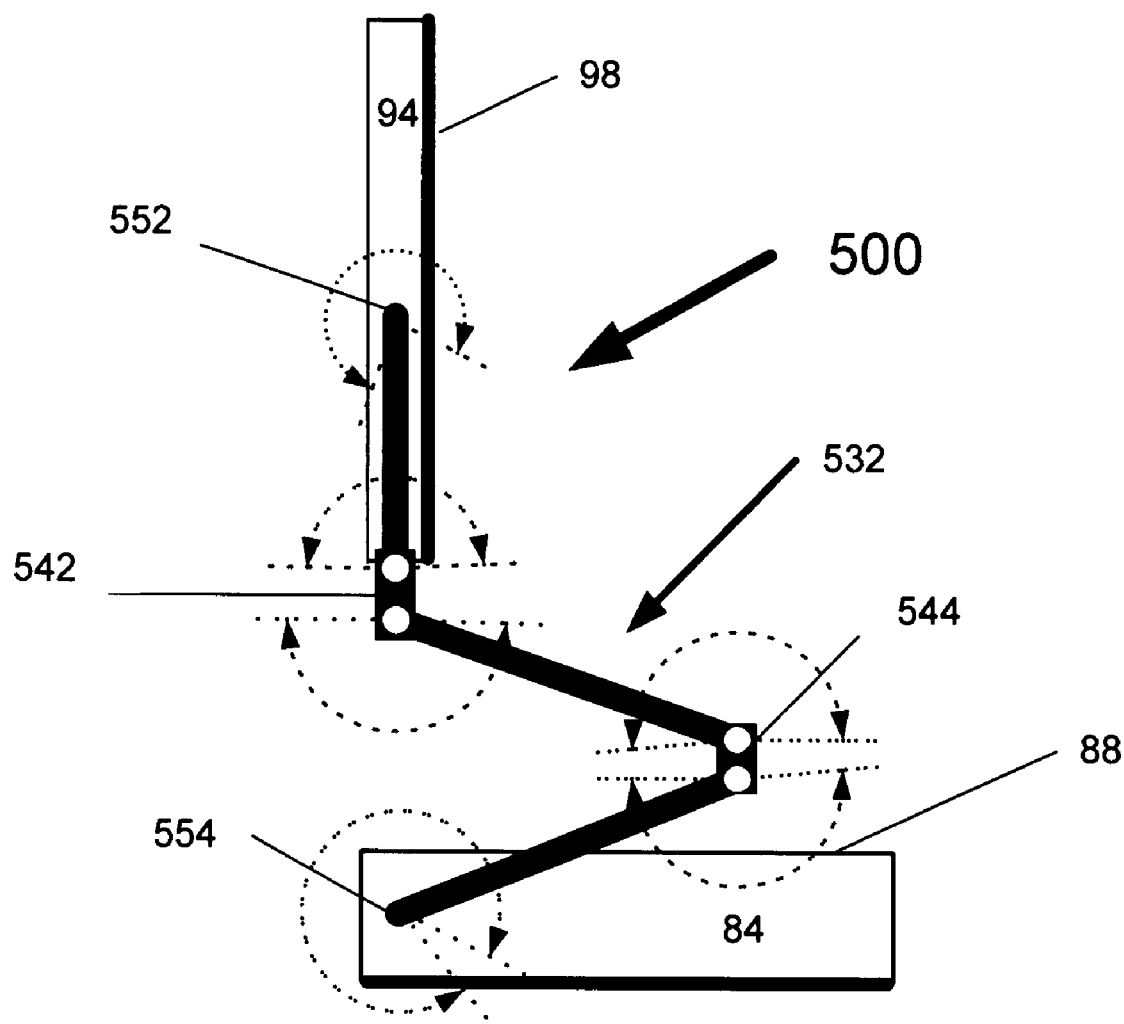

FIG. 41 is a perspective side view of computer 500 in a position where the screen is lifted and facing the user, and the keyboard facing down. (This is for the stylus input configuration.)

Figure 42:
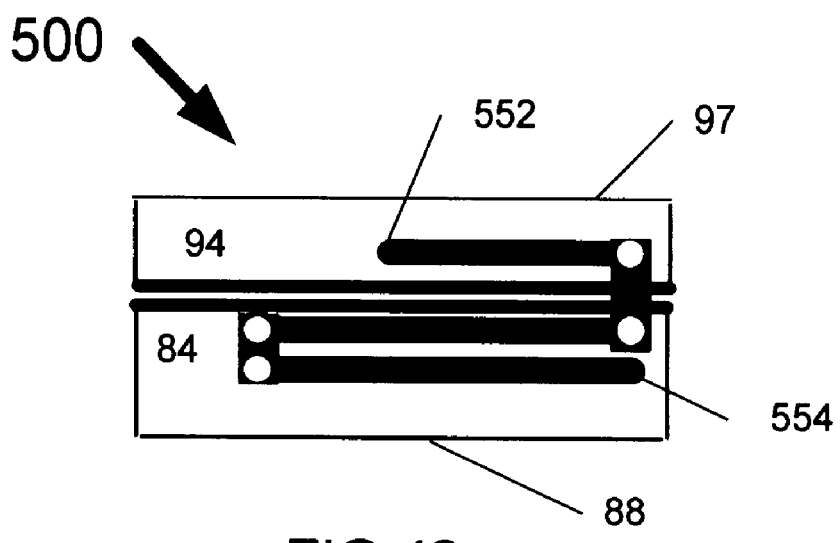

FIG. 42 is a perspective side view of computer 500 in a conventional closed position with arms folded.

Figure 43:
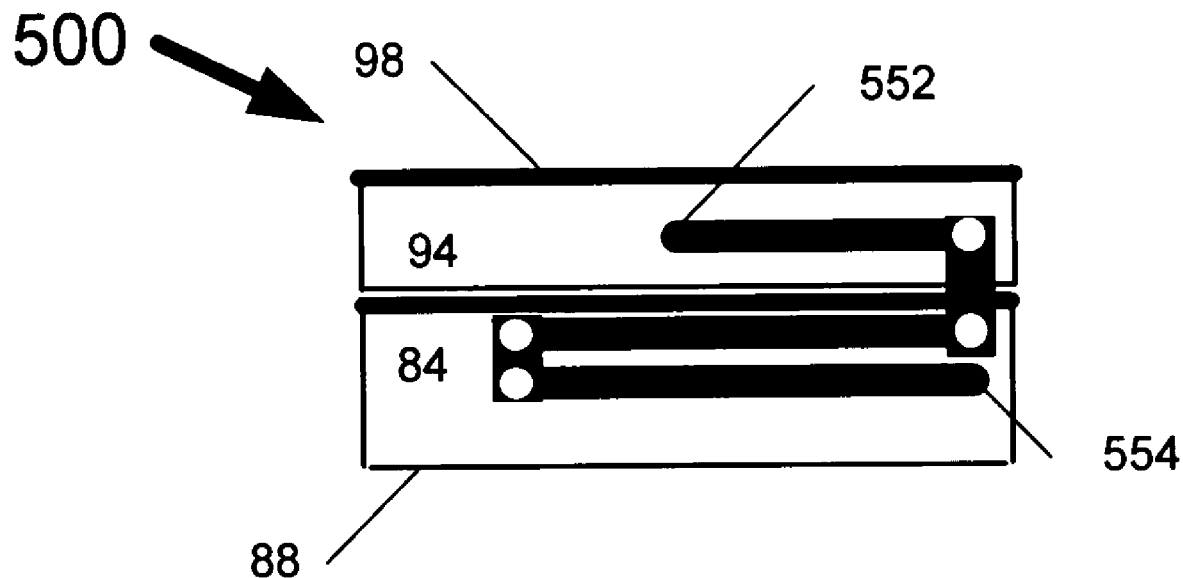

FIG. 43 is a perspective side view of computer 500 in a closed position with arms folded and screen facing up (for the tablet PC configuration).

Figure 44:
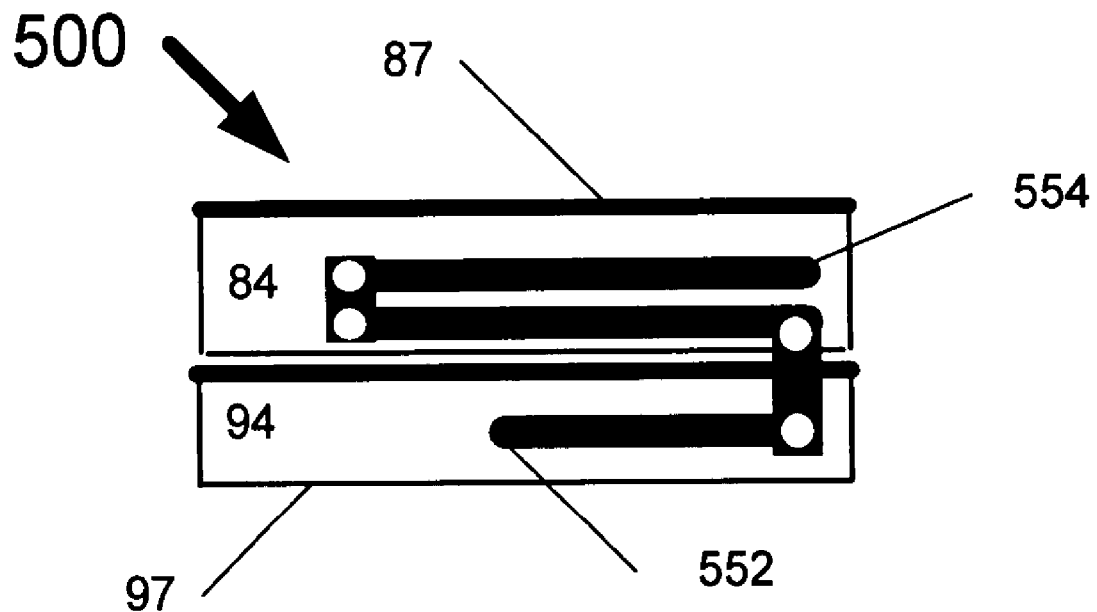

FIG. 44 is a perspective side view of computer 500 in a closed position with arms folded, base sitting on top of the display, and keyboard facing up (for space saving when the portable computer is used as a desktop machine).

DETAILED DESCRIPTION OF THE PREFERRED AND ALTERNATIVE EMBODIMENTS

Drawing Notations: Basic Building Blocks

FIG. 2 is a list of notations used in the drawings to represent a joint connecting two arm sections. They show how the attached arm sections can rotate relatively to the joint. ("relative" means that it can also been seen as the joint rotating while the arm section remain still.)

FIG. 2A denotes a joint which allows the two attached sections to rotate around the joint; and they rotate on two parallel planes.

FIG. 2B denotes a joint which allows the two attached sections to rotate around the same axis; and they rotate on the same plane.

FIG. 2C denotes a joint which allows the two attached sections to independently rotate around the joint on a common plane; and the sections will not overlap in a folded position. (The point of view dictates which one of the two pictures to use in the drawings.)

FIG. 2D denotes a joint which allows the two attached sections to turn independently in relatively opposite direction.

FIG. 2E is perspective view of a combination of two joints and three arm sections. The purpose is to show how simple joints can be combined to allow more flexible rotations of the end sections. Around joint 841, arm section 831 can rotate in any selected plane; and the selected plane can change when arm section 832 turns (relative to arm section 833) around joint 842. If we look at the combination as a whole, the end sections 831 and 833 can turn independently on separate planes. That is, even when arm section 833 stays still, arm section 831 can turn on its own on a selected plane; and furthermore, this selected plane can change even when section 833 does not move. (In engineering implementation, if the middle section 832 is short, it may help to think of such a joint combination as just one combo-joint mechanism which allows the two attached end sections 831 and 833 to rotate independently. Therefore, we also have the notation of FIG. 2F.)

FIG. 2F denotes a joint which allows the two attached sections to rotate independently around two separate axes, and they rotate on two separate planes. There is more than one variation (two being shown here). The point of view dictates which variation to use in a drawing. In general, this type of joint is marked by a block circle containing two of the three symbols: a white vertical bar, a white horizontal bar, and a white circle, which are used to indicate the planes for the associated arm sections to rotate on. We generally use the white horizontal bar to indicate the associated arm section that can rotate on a plane parallel to the base of the portable computer. We use the white vertical bar to indicate the associated arm section that can rotate on a plane that is perpendicular to the base of the computer, and that the plane is invisible or reduced to a line from the perspective view point of the drawing. And we use the white circle to indicate the plane that is also perpendicular to the base of the computer, but the plane is at least partially visible from the perspective view point of the drawing. (This notation is somewhat analogous to the 3D coordinates. But it is not the same because the three planes here do not have to be perpendicular to one another. In engineering implementation, this type of joint can be substituted with a joint-combo such as FIG. 2E.)

FIG. 4A is a perspective view of the display of a portable computer in an upward position. Display 90 generally has two sides and four edges: viewing screen side 98, back side 97, upper edge 91, lower edge 92, left edge 93, and right edge 94 (from the user's normal view point).

FIG. 4B is a perspective view of the base of a portable computer. Base 80 preferably includes a central processing unit and other electronic components and a data entry member, such as a keyboard. Base 80 generally has two sides and four edges: upper side (keyboard) 87, bottom side 88, front or user edge 81, back edge 82, left edge 83, and right edge 84 (from the user's normal view point). The bottom side 88 can sometimes be used by an alternative data entry member, such as stylus input.

First Embodiment

FIGS. 6 to 17 show a portable computer (100) according to a first embodiment of the present invention. Computer 100 has one single back arm.

FIG. 6A is a perspective view of the portable computer (100) of the first embodiment of the present invention. This embodiment includes a display 90, a base 80, and a multi-sectioned arm 130. One end section 131 of the arm is connected to the display at pivot 151; and the other end section 134 is connected to the based at pivot 152. Pivot 151 allows the display to rotate relatively around arm section 131; and pivot 152 allows the base to rotate relatively to arm section 134. Consequently the portable computer can be arranged into various configurations by controlling how display 90 and base 80 face each other. (Alternatively, such configurations can be obtained by simply detaching the arms, setting up the display and the base to the desired configurations, and re-attaching the arms again.) Arm sections 132 and 133 can be adjusted independently around joint 143, as assisted by joint 142 and joint 144 (a function denoted as a white circle in the black circle), respectively. Together they allow the arm to control the continuous movement of pivot 151 (and thus the screen) within a selected plane. Besides, this selected plane can be changed continuously using a function of joint 141 (denoted as a horizontal white bar inside the black circle), together with its counterpart in joint 144. Therefore, the viewing screen's position can be adjusted continuously within a three dimensional space of semi-diameter equal to the total length of arm sections 132 and 133. The screen's viewing angle can be adjusted using the other function of joint 141 (denoted as a vertical white bar). There are locks to prevent the end sections 131 and 134 from unintentional detachment. There are also mechanisms to control how much the end sections of the arm can rotate at pivots 151 and 152, respectively.

FIG. 6B is the top portion the arm connected to the display of computer 100. This portion can be substituted by an alternative version as shown in FIG. 6C. One function of joint 141 (as in FIG. 6B) is to tilt the screen for different viewing angle; and this can be achieved by turning display 90 at the "T-shaped" arm section 138 (as in FIG. 6C). The ability for the display to turn around the end section 131 (as in FIG. 6B) can be achieved by turning the "T-shared" arm section at joint 147 (as in FIG. 6C). And the function of joint 142 in assisting the arm section 132 to turn (as in FIG. 6B) can be achieved by a function of joint 148 (denoted as a white circle in the black circle, as in FIG. 6C). And finally, one function of joint 141 as denoted by the horizontal white bar inside the black circle (as in FIG. 6B) can be achieved by the counterpart in joint 148 (as in FIG. 6C).

FIG. 7 is a perspective view of computer 100 in a closed position. This position can be obtained by folding arm 130 in FIG. 6A.

FIG. 8 is a perspective view of computer 100 in a conventionally opened, screen-up position, with the folded arm placed next to the base's right back edge 82 (from the user's point of view). This position can be obtained by lifting the end section 131 around joint 141 in FIG. 7.

FIG. 9 is a perspective view of computer 100 in a conventionally opened, screen-up position, with the folded arm placed next to the base's left back edge 82 (from the user's point of view). This position can be obtained by swinging the arm sections simultaneously around 141 and 144 (using the functions denoted by the horizontal white bars inside the black circles) in FIG. 8

FIG. 10 is a perspective view of computer 100 in a conventionally opened, screen-up position, with the folded arm placed away from the base's back edge 82 (to avoid blocking the back edge 82 of the base for other uses, such as various cable outlets.) This position can be obtained by swinging the arm simultaneously using the functions denoted by the horizontal white bars in 141 and 144 in FIG. 8.

FIG. 11 is a perspective view of computer 100 in a position where the display is up-lifted, screen facing the user, and the arm being away from the back edge 82 of the base. This position can be obtained by opening up arm 130 in FIG. 10.

FIG. 12 is a perspective left side view of computer 100 in an opened, screen-up position, where the screen is away from its conventional vertical position towards the user. This position can be obtained by adjusting the rotation angles of 132 and 133 at joint 143 in FIG. 11.

FIG. 13 is a perspective view of computer 100 in an opened, screen-up position, where arm sections 132 and 133 are positioned near the back edge 82 of the base. This position can be obtained by lifting the end section 131 around joint 141 in FIG. 6A.

FIG. 14 is a perspective view of computer 100 in an opened, screen-up and backward facing position, where arm sections 132 and 133 are positioned near the back edge 82 of the base. This position can be obtained from FIG. 8 by turning the screen to the back.

FIG. 15 is a perspective view of computer 100 in a closed position with viewing screen 98 facing upward (for the tablet PC configuration). This position can be obtained by closing down the display from FIG. 14.

FIG. 16 is a perspective view of computer 100 in an open position in which the viewing screen 98 is facing the front, and the whole display is lifted and positioned towards to the right side of the user (suitable for view sharing.) This position can be obtained by moving display 90 towards the right side of the user in FIG. 13.

FIG. 17 is a perspective view of computer 100 in a closed position with the base sitting on top of the display (for the space-saving configuration). This position can be obtained from FIG. 13 in the following steps: Rotate base 180° around arm section 134 (connected at pivot 152) to let the keyboard face down; close the computer; and turn the computer downside-up.

Second Embodiment

FIGS. 18 to 27 show a portable computer (200) of a second embodiment of the present invention. Computer 200 has two double-sectioned side arms.

FIG. 18A is a perspective view of the portable computer (200) of the second embodiment of the invention. The computer has two double-sectioned side arms. It is in a position where the screen is lifted and facing the user. The portable computer 200 generally includes a display 90, a base 80, and two double-sectioned side arms 231 and 232. The left arm 231 is connected to the display at pivot 251, and to the base at pivot 253. The right arm 232 is connected to the display at pivot 252, and to the base at pivot 254. The viewing angle of the screen can be adjusted by rotating the display at least 360° around pivot 251 and pivot 252. The double-sectioned arms can be adjusted synchronously through joints 241 and 242, thus allowing continuous adjustment of the display's position by height and depth (see Configuration (1) in the Background section). The range of adjustment can be as far as the length of the fully stretched arms. The portable computer can be arranged into various configurations by setting how the screen 98 and the keyboard 87 face each other; and this can be achieved by turning the base and display around the connection pivots (at 251, 252, 253, and 254). There are locks to prevent the arms from unintentional detachment from the base and the display. There are also mechanisms to control how much the end sections of the arm can turn at pivots 251, 252, 253, and 254.

FIG. 18B is a split view of arm 232 of computer 200 and an alternative arm design. It shows how the joint of the double-sectioned arm can be substituted by a different type of joint. In the alternative joint type, the two attached arm sections can rotate around a common axis but move on two parallel plane (to avoid collision in folding position).

FIG. 19 is a perspective view of computer 200 in a closed, arms folded position. It also shows how the arms can be detached. This position can be obtained by turning the screen face down and then folding the arms.

FIG. 20 is a perspective view of computer 200 in conventional open position.

FIG. 21 is perspective side view of computer 200 in a position with the screen up-lifted and facing the user. It shows how the upper and lower sections of arm 232 can turn independently around joint 242. It also shows how the display can rotate around arm at 252 and how the arm can turn relatively around the base at 254. (The left arm is not shown in this view.) These mechanisms allow the portable computer to transition from its current position to any of the configurations as shown in FIG. 24-FIG. 26. (Alternatively, these configurations can be obtained by detaching the arms, setting up the display and the base to the desired configurations, and re-attaching the arms again.)

FIG. 22 is a perspective side view of computer 200 in a conventional open position with arms folded and lifted up to avoid blocking the edge 84 of the base for other uses (such as a DVD player).

FIG. 23 is a perspective side view of computer 200 in an unconventional open position with arms partially stretched to reach behind the back edge of the display. (This is to show how flexible the display's viewing position can be.)

FIG. 24 is a perspective side view of computer 200 in an open position with display 90 up-lifted and the keyboard faced down (for the stylus configuration (4)). This position can be obtained from FIG. 21 by two steps: turn the base around pivot 254 to a face-down position; and then adjust 232.

FIG. 25 is a perspective side view of computer 200 in a conventional closed position with arms folded and screen facing the keyboard.

FIG. 26 is a perspective side view of computer 200 in a closed position with arms folded, screen facing up, and the based stacked underneath the display. (This is for the tablet PC configuration.) This is position can be obtained from FIG. 21 in the following steps: Flip the base to make the keyboard face down (by rotating the base around pivot 254); fold the arm towards the right hand side in FIG. 21 (i.e. in the opposite direction to how the arm is normally opened and closed in the notebook configuration); and close down display (with screen facing up).

FIG. 27 is a perspective side view of computer 200 in a closed position with arms stretched and screen facing up. (This is an alternative design to support the tablet PC configuration. In this special design, the length of the arm 232 should not exceed the length of side edge 84.)

Third Embodiment

FIGS. 28 to 33 show a portable computer (300) of a third embodiment of the present invention. The third embodiment is an enhancement of the second embodiment by substituting the side arms in computer 200 with an enhanced pair of arms, in order to allow the display to move left or right relative to the base.

FIG. 28A is a perspective view of a portable computer (300) of the third embodiment of the present invention. The third embodiment is an extension of the second embodiment by substituting the side arms (231 and 232) in computer 200 with a different pair of arms as shown in FIG. 28B. Each of these new arms has two additional combo-joints 341 and 345 (also 342 and 346 on the other arm). The additional joints allow the middle sections of the arms to swing away from the side edges of the computer (300), and consequently enabling the display to move sideway, as shown in FIG. 33. This swinging movement uses the functions of the joints denoted by white horizontal bars inside the black circles (joints 341, 345, 342, and 346). And the white circles inside the black circles are for cooperation with middle joints 343 and 344 in folding and stretching of the long sections (333, 335, 334, and 336). In addition to sideway movement for the display (or adjustment by width as specified in Configuration (2) of the Background Section), computer 300 of the third embodiment retains all the allowable positions and configurations of computer 200 the second embodiment.

FIG. 28B is a split view of arms 231 and 232 of computer 200 (as shown in FIG. 18A) and an alternative pair of arms.

Substituting the arms leads to the third embodiment of the present invention as shown in FIG. 28A.

FIG. 29 is a perspective view of portable computer 300 in a closed position, with the arms folded.

FIG. 30 is a perspective view of portable computer 300 in a conventional open position, with arms folded and parked alongside the edges of the base (80).

FIG. 31 is a perspective view of portable computer 300 in an open position, with arms folded and reached out from the back of the computer. This position can be obtained from FIG. 28A by folding the arms (around joints 343 and 344) in the opposite direction from the way they are normally folded when the computer is in a conventional close position as shown in FIG. 29.

FIG. 32 is a perspective view of portable computer 300 in an open position, with arms folded, reached out first from the back of the computer, and then turned sideway away from the computer. This position can be obtained from FIG. 31 by turning the middle sections 333 and 335 around joints 341 and 345 on one arm, respectively (and also sections 334 and 334 around joints 342 and 346 on the other arm, respectively). This position places the sections 333 and 335, and 334 and 336 all on the same plane. This is a preparation for the position in FIG. 33.

FIG. 33 is a perspective view of portable computer 300 in an open position, with arms partially stretched, and with the display partially up-lifted and reached out towards the right hand side of the computer (from the user's point of view.) This position can be obtained from FIG. 32 by moving the arms sections simultaneously, 333 and 345 on one arm, and 344 and 346 on the other; and this simultaneous movement is possible when these four arm sections are on the same plane, a condition set up in FIG. 32.

Fourth Embodiment

FIGS. 34 to 39 show a portable computer (400) according to a fourth embodiment of the present invention. Computer 400 has a bridge arm.

FIG. 34A is a perspective view of the portable computer (400) of the fourth embodiment of the present invention. This embodiment has one multi-sectioned bridge arm. It is in a position where the screen is lifted and facing the user. The portable computer 400 generally includes a display 90, a base 80, and a multi-sectioned bridge arm 430. The bridge arm sections 433 and 434 are attached to the based at pivots 451 and 452, respectively; and the middle section 439 is connected to the display at pivot 450. The viewing angle of the screen can be tilted by turning arm section 439 relatively to joints 441 and 442. The screen can rotate around pivot 450. Upper side arm sections 431 and 432 (similarly lower side arm sections 433 and 434) are adjustable synchronously. Adjusting the side arm sections allows continuous adjustment of the display's position by height and depth (Configuration (1) of the Background Section). The range of adjustment is limited by the length the side arm sections. The portable computer can be arranged into various configurations by setting how the screen 98 and the keyboard 87 face each other. There are locks to prevent the arms from unintentional detachment from the base and the display. (FIG. 39 shows how the arm can be completely detached from the base and the display.) There are also mechanisms to control how much the end sections of the arm can turn at pivots 451, 452, 453, and 454.

FIG. 34B is a perspective side view of a portion of computer 400 in FIG. 34A. It shows how side arm sections 432 and 434 can be adjusted relatively to the joint and the base.

FIG. 35 is a perspective view of computer 400 in the conventional open position.

FIG. 36 is a perspective view of computer 400 in the conventional closed position.

FIG. 37 is a perspective view of computer 400 in an open position with the arm folded and the screen facing away from the user. This position can be obtained from FIG. 35 by turning the display around the attached arm section at pivot 450.

FIG. 38 is a perspective view of computer 400 in a closed position with screen facing upward. This position can be obtained from FIG. 37 by closing down the display.

FIG. 39 is a perspective view of computer 400 when the arm is completely detached from base 80 and display 90. There is a mechanism at pivot 452 which allows the arm section to be detached. (For example, one possible implementation can be that the pivot can be pushed in at 452 to make room for the release of the arm at the other pivot 451 first, which is then followed by the release at pivot 452.)

Fifth Embodiment

FIG. 40 to FIG. 44 show a portable computer (500) according to a fifth embodiment of the present invention. Computer 500 is an enhancement of computer 200 by adding an additional section to each of the two side arms. The purpose is to show that it is possible to have side arms with more than two sections.

FIG. 40 is a perspective side view of computer (500) having two triple-sectioned side arms. It is in a position where the screen is lifted and facing the user. The portable computer generally includes a display 90, a base 80, and two triple-sectioned side arms attached to base and the display on their left and right sides. The adjustability of the display and the allowable configurations of this portable computer are similar to those of portable computer 200. FIG. 40 shows how the arm sections, joints, and pivots can be adjusted. It allows the portable computer to transition from its current position to a variety of the positions such as FIG. 41, FIG. 42, FIG. 43, and FIG. 44.

FIG. 41 is a perspective side view of computer 500 in a position where the screen is lifted and facing the user, and the keyboard facing down. (This is for the stylus input configuration.) This position can be obtained from FIG. 40 by the following steps: turn the base around pivot 554; stretch the lower two sections of arm and then partially fold them back in the opposite direction around joint 544; turn the display around pivot 552.

FIG. 42 is a perspective side view of computer 500 in a conventional closed position with arms folded.

FIG. 43 is a perspective side view of computer 500 in a closed position with arms folded and screen facing up (for the tablet PC configuration).

FIG. 44 is a perspective side view of computer 500 in a closed position with arms folded, based sitting on top of the display, and keyboard facing up (for space saving when the portable computer is used as a desktop machine).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A portable electronic device comprising:
   (a) a base having one or more input surfaces, a front edge, a back edge, a left edge, and a right edge;
   (b) a display having a screen for viewing, an upper edge, a bottom edge, a left edge, and a right edge;
   (c) an arm having two or more sections joined together, wherein at least two said joined sections are relatively rotatable; wherein through relative rotations of some of said jointed arm sections, said arm can be expanded;
   (d) at least one of said arm sections is connected to said base and at least one of said arm sections is connected to said display wherein said arm sections, said display and said base rotate around a plurality of rotational axes and at least two of said rotational axes can be set to be non-parallel to each other; wherein in an open viewing position said display can move along a straight line direction relative to said input surface of said base while maintaining a direction that the screen is facing;
   wherein said arm has a motion that is capable of opening and folding said display from and against said base; wherein when said display is open for viewing, the viewing angle of said display can be tilted; and wherein said display can move substantially in at least one direction selected from the group consisting of: an up and down direction relative to said base, a forward and backward direction relative to said base in a predefined usage orientation, and a left and right direction relative to said base in a predefined usage orientation.

2. The portable electronic device of claim 1, further comprising a mechanism for limiting some relative rotations of said arm sections, said display, and said base within predetermined ranges.

3. The portable electronic device of claim 1, wherein said arm is connected to either or both of said left edge and right edge of said base, and also connected to either or both of said left edge and right edge of said display.

4. The portable electronic device of claim 3, wherein for all the pivotal axes involved in the relative rotations of arm sections, said display, and base, at least one of the following conditions is true:
   (a) said arm sections, said display, and said base can be brought to a relative position in which none of said pivotal axes goes through both central portions of said left edge and right edge of said display; and
   (b) said arm sections, said display, and said base can be brought to a relative position in which none of said pivotal axes goes through both central portions of said left edge and right edge of said base.

5. The portable electronic device of claim 3, wherein at least one of the following conditions is true:
   (a) Of all the connections between said arm and said display, at least one connection is located away from the central portions of said left edge and right edge of said display; and
   (b) Of all the connections between said arm and said base, at least one connection is located away from the central portions of said left edge and right edge of said base.

6. The portable electronic device of claim 1, wherein said arm is connected to said base and said display in one of the following ways:
   (a) said arm is connected to said bottom edge of said display, and to either or both of said left edge and right edge of said base; and
   (b) said arm is connected to said back edge of said base, and to either or both of said left edge and right edge of said display.

7. The portable electronic device of claim 1, wherein said arm is connected to said back edge of said base, and also connected to said bottom edge of said display; wherein wiring between said display and said base runs through said arm.

8. The portable electronic device of claim 1, wherein when said display is in an upright viewing position, the viewing angle of said display can be tilted along a vertical axis.

9. The portable electronic device of claim 1, wherein said portable electronic device supports at least one feature selected from the following group:
   (a) when said display and said base are folded together, said arm can be folded and parked substantially alongside and parallel to said back edge of said base;
   (b) in a conventional open viewing position in which said display is not elevated above said base and is about perpendicular to said base, said arm can be folded and parked substantially alongside and parallel to said back edge of said base.

10. The portable electronic device of claim 9, wherein in said conventional open position, said folded arm can be turned away from said back edge of said base.

11. A portable electronic device comprising:
    (a) a base having one or more input surfaces;
    (b) a display having a screen for viewing;
    (c) two arms, each said arm having two or more sections joined together, wherein at least two said joined sections are relatively rotatable;
    (d) at least one of said sections of each said arm is connected to said base and at least one of said sections of each said arm is connected to said display; and
    wherein said arms have a motion that is capable of opening and folding said display from and against said base; wherein when said display is open for viewing, the viewing angle of said display can be tilted; and wherein in an open viewing position, said display can move along a straight line direction that is relative to one of said input surfaces of said base, while maintaining the direction that the screen is facing; and wherein said arm sections, said display and said base rotate around a plurality of rotational axes and at least two of said rotational axes can be set to be non-parallel to each other.

12. The portable electronic device of claim 11, further comprising a mechanism for limiting some relative rotations of said arm sections, said display, and said base within predetermined ranges.

13. The portable electronic device of claim 11, wherein at least one said arm has three or more sections.

14. The portable electronic device of claim 11, wherein said base has a front edge, a back edge, a left edge, and a right edge; wherein said display has an upper edge, a bottom edge, a left edge, and a right edge; wherein for all the pivotal axes involved in the relative rotations of arm sections, said display, and base, at least one of the following conditions is true:
    (a) said arm sections, said display, and said base can be brought to a relative position in which none of said pivotal axes goes through both central portions of said left edge and right edge of said display; and
    (b) said arm sections, said display, and said base can be brought to a relative position in which none of said pivotal axes goes through both central portions of said left edge and right edge of said base.

15. The portable electronic device of claim 11, wherein said base has a front edge, a back edge, a left edge, and a right edge; wherein said display has an upper edge, a bottom edge, a left edge, and a right edge; and wherein at least one of the following conditions is true:

(a) Of all the connections between said arms and said display, at least one connection is located away from the central portions of said left edge and right edge of said display; and (b) Of all the connections between said arms and said base, at least one connection is located away from the central portions of said left edge and right edge of said base.

16. A portable electronic device comprising:
(a) a base having one or more input surfaces;
(b) a display having a screen for viewing;
(c) a set of one or more arms, each said arm having two or more sections joined together, wherein at least two said joined sections are relatively rotatable;
(d) at least one of said arm sections of each said arm is connected to said base and at least one of said arm sections of each said arm is connected to said display;
wherein said set of arms has a motion that is capable of opening and folding said display from and against said base, and wherein in an open viewing position said display can move along a straight line direction relative to said input surface of said base while maintaining a direction that the screen is facing; and wherein said arm sections, said display and said base rotate around a plurality of rotational axes and at least two of said rotational axes can be set to be non-parallel to each other; and wherein when said display is open for viewing, the viewing angle of said display can be tilted.

17. The portable electronic device of claim 16, wherein said display is allowed to move along a single direction that is perpendicular to one of said input surfaces of said base.

18. The portable electronic device of claim 16, further supporting at least one feature selected from the following group:

(a) When said base and said display are folded together, said screen can be arranged to face away from said base;

(b) When said base and said display are folded together, each said input surface of said base can be arranged to face away from said display; and (c) in a conventional open viewing position in which said display is not elevated above said base and is about perpendicular to said base, each said input surface of said base can be arranged to face upward.

19. The portable electronic device of claim 16, wherein wiring between said display and said base runs through at least one of said arms.

20. The portable electronic device of claim 16, wherein the relative rotations of said arm sections, said display, and said base involve at least four rotational axis.

21. The portable electronic device of claim 16, wherein said set of arms includes two separate arms.

* * * * *